(12) United States Patent
Takahashi et al.

(10) Patent No.: US 12,139,232 B2
(45) Date of Patent: Nov. 12, 2024

(54) CONTROL SYSTEM FOR HUMAN-POWERED VEHICLE

(71) Applicant: Shimano Inc., Osaka (JP)

(72) Inventors: Ayako Takahashi, Osaka (JP); Takuma Sakai, Osaka (JP); Yasuyuki Komada, Osaka (JP); Takaya Masuda, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 17/684,744

(22) Filed: Mar. 2, 2022

(65) Prior Publication Data

US 2022/0306242 A1 Sep. 29, 2022

(30) Foreign Application Priority Data

Mar. 23, 2021 (DE) ............ 10 2021 107 138.0

(51) Int. Cl.
*B62M 25/08* (2006.01)
(52) U.S. Cl.
CPC .................................. *B62M 25/08* (2013.01)
(58) Field of Classification Search
CPC ......... B62L 3/023; B62K 23/06; B62M 25/08
See application file for complete search history.

(56) References Cited

U.S. PATENT DOCUMENTS

| | | | |
|---|---|---|---|
| 9,394,031 B2 | 7/2016 | Oku et al. | |
| 9,522,714 B2 | 12/2016 | Komatsu et al. | |
| 10,493,975 B2 | 12/2019 | Komatsu et al. | |
| 10,505,588 B2 | 12/2019 | Tetsuka et al. | |
| 10,583,890 B2 | 3/2020 | Komada et al. | |
| 10,766,569 B2 | 9/2020 | Kasai | |
| 10,807,675 B2 | 10/2020 | Bierwerth et al. | |
| 2008/0168856 A1 | 7/2008 | Tetsuka | |
| 2012/0160625 A1* | 6/2012 | Jordan | B60T 7/102 188/344 |
| 2015/0203169 A1* | 7/2015 | Nishino | F16H 59/04 74/491 |
| 2015/0284049 A1* | 10/2015 | Shipman | B62K 23/06 74/473.12 |
| 2016/0311499 A1 | 10/2016 | Kasai | |
| 2017/0101162 A1* | 4/2017 | Tachibana | B62M 25/08 |
| 2018/0183255 A1* | 6/2018 | Shahana | B62J 3/10 |
| 2019/0185109 A1* | 6/2019 | Howell-McLean | B62M 25/08 |
| 2020/0346710 A1 | 11/2020 | Komatsu et al. | |
| 2021/0061412 A1* | 3/2021 | Kawakami | B62M 25/08 |

\* cited by examiner

*Primary Examiner* — Charles A Fox
*Assistant Examiner* — Gregory T Prather
(74) *Attorney, Agent, or Firm* — Global IP Counselors, LLP

(57) ABSTRACT

A control system is provided for a control device of a human-powered vehicle. The control system includes a first operating device, a second operating device, a wireless communication unit and a control unit. The first operating device includes a first base, a first operating member, a first handlebar and a first electrical switch unit. The second operating device includes a second base, a second handlebar attachment and a second electrical switch unit. The second operating device is electrically connected to the first operating device. The wireless communication unit is electrically connected to the first operating device and the second operating device. The control unit is configured to selectively control the wireless communication unit to establish wireless communication with an operated device in accordance with a control state of the control unit.

19 Claims, 14 Drawing Sheets

CONTROL SYSTEM FOR HUMAN-POWERED VEHICLE

CROSS-REFERENCE TO RELATED APPLICATIONS

This application claims priority to German Patent Application No. 10 2021 107 138.0, filed on Mar. 23, 2021. The entire disclosure of German Patent Application No. 10 2021 107 138.0 is hereby incorporated herein by reference.

BACKGROUND

Technical Field

This disclosure generally relates to a control system for a human-powered vehicle.

Background Information

In recent years, some bicycles are provided with electric components or devices to make it easier for the rider to operate the bicycle. Examples of such electric components include suspensions, transmission devices (e.g., derailleurs, internally geared hubs, etc.), operating devices and seatposts. Typically, each the electric components is operated by an operating devices that interconnects the operating device to the electric component. In more recent years, control systems exist that wirelessly interconnect the electric components to the operating devices.

SUMMARY

Generally, the present disclosure is directed to various features of a control system for a human-powered vehicle. The term "human-powered vehicle" as used herein refers to a vehicle that can be driven by at least human driving force, but does not include a vehicle using only a driving power other than human power. In particular, a vehicle solely using an internal combustion engine as a driving power is not included in the human-powered vehicle. The human-powered vehicle is generally assumed to be a compact, light vehicle that sometimes does not require a license for driving on a public road. The number of wheels on the human-powered vehicle is not limited. The human-powered vehicle includes, for example, a monocycle and a vehicle having three or more wheels. The human-powered vehicle includes, for example, various types of bicycles such as a mountain bike, a road bike, a city bike, a cargo bike, and a recumbent bike, and an electric assist bicycle (E-bike).

In view of the state of the known technology and in accordance with a first aspect of the present disclosure, a control system is provided for a human-powered vehicle. The control system basically comprises a first operating device, a second operating device, a wireless communication unit and a control unit. The first operating device includes a first base, a first operating member, a first handlebar attachment and a first electrical switch unit. The first handlebar attachment is provided to the first base. The first electrical switch unit is coupled to at least one of the first base and the first operating member. The second operating device includes a second base, a second handlebar attachment and a second electrical switch unit. The second handlebar attachment is provided to the second base. The second electrical switch unit is coupled to the second base. The second operating device is electrically connected to the first operating device. The wireless communication unit is electrically connected to the first operating device and the second operating device. The control unit is configured to selectively control the wireless communication unit to establish wireless communication with an operated device in accordance with a control state of the control unit.

With the control system according to the first aspect, a single wireless communication unit can be used to selectively control an operated device with either the first operating device or the second operating device.

In accordance with a second aspect of the present disclosure, the control system according to the first aspect is configured so that the wireless communication unit is disposed on at least one of the first operating device, the second operating device and the control unit.

With the control system according to the second aspect, the wireless communication unit can be conveniently located.

In accordance with a third aspect of the present disclosure, the control system according to the first or second aspect further comprises a wired communication port electrically connected to the control unit for selectively connecting the first operating device and the second operating device to the operated device via an electrical cable.

With the control system according to the third aspect, it is possible for the occupant to selectively control an operated device with either by wireless communication or wired communication.

In accordance with a fourth aspect of the present disclosure, the control system according to the third aspect is configured so that the control state includes a first control state where the wired communication port is electrically connected to the electrical cable, and a second control state where the wired communication port is free from electrically connecting to the electrical cable, and the control unit is configured to establish wired communication, where the first operating device and the second operating device are electrically connected to the operated device via the electrical cable in the first control state.

With the control system according to the fourth aspect, the control unit is configured to establish wired communication with the operated device when the control unit is connected to the operated device via an electric cable.

In accordance with a fifth aspect of the present disclosure, the control system according to the fourth aspect is configured so that the control unit is configured to establish the wireless communication in the second control state.

With the control system according to the fifth aspect, the control unit is configured to establish wireless communication with the operated device when the control unit is not connected to the operated device via an electric cable.

In accordance with a sixth aspect of the present disclosure, the control system according to the fourth or fifth aspect is configured so that the control unit is further configured to control electric power supplied from a first power supply to the first operating device and the second operating device in the first control state.

With the control system according to the sixth aspect, it is possible to control the supply of the electric power to the first operating device and the second operating device from a single remote power supply.

In accordance with a seventh aspect of the present disclosure, the control system according to the sixth aspect is configured so that the first power supply is connected to at least one of the first operating device, the second operating device and the control unit.

With the control system according to the seventh aspect, it is possible for the power supply to be connected to one or more of the first operating device, the second operating device and the control unit.

In accordance with an eighth aspect of the present disclosure, the control system according to any one of fourth to seventh aspects is configured so that the control unit is further configured to control electric power supplied from a second power supply such that the first operating device and the second operating device are wirelessly in communication with the operated device via the wireless communication unit in the second control state.

With the control system according to the eighth aspect, it is possible to supply electric power from a local power supply when the control system is not connected to a remote power supply so that wireless communication can be carried out.

In accordance with a ninth aspect of the present disclosure, the control system according to the eighth aspect is configured so that the second power supply is disposed to at least one of the first operating device, the second operating device, the control unit and the wireless communication unit.

With the control system according to the ninth aspect, the second power supply can be conveniently located at one or more of the first operating device, the second operating device, the control unit and the wireless communication unit.

In accordance with a tenth aspect of the present disclosure, the control system according to any one of first to ninth aspects is configured so that at least one of the first operating device and the second operating device includes an electrical connecting port.

With the control system according to the tenth aspect, it is possible to easily connect and disconnect the first operating device and the second operating device together.

In accordance with an eleventh aspect of the present disclosure, the control system according to the tenth aspect is configured so that the other one of the first operating device and the second operating device includes an electrical connector that is coupled into the electrical connecting port.

With the control system according to the eleventh aspect, it is possible to easily connect and disconnect the first operating device and the second operating device together.

In accordance with a twelfth aspect of the present disclosure, the control system according to any one of first to eleventh aspects further comprises a detector configured to detect information of the control state.

With the control system according to the twelfth aspect, the control unit can easily determine the current control state for selecting either wired communication or wireless communication.

In accordance with a thirteenth aspect of the present disclosure, the control system according to any one of first to twelfth aspects further comprises a notification unit configured to notify the control state.

With the control system according to the thirteenth aspect, the occupant can easily determine the current control state.

In accordance with a fourteenth aspect of the present disclosure, the control system according to any one of first to thirteenth aspects is configured so that the first operating device includes at least one first user input disposed to at least one the first operating member and the first base, the first user input is connected to the first electrical switch unit, and the second operating device including at least one of a second user input and a second operating member, the at least one of the second user input and the second operating member is connected to the second electrical switch unit.

With the control system according to the fourteenth aspect, an occupant can easily operate the first operating device using a first input and can easily operate the second operating device using a second user input.

In accordance with a fifteenth aspect of the present disclosure, the control system according to any one of first to fourteenth aspects is configured so that the first operating member is pivotally mounted to the first base.

With the control system according to the fifteenth aspect, the first operating member can be used to operate a mechanical cable (e.g., a Bowden cable).

In accordance with a sixteenth aspect of the present disclosure, the control system according to any one of first to fifteenth aspects is configured so that the control unit is configured to selectively transmit a signal in accordance with actuation of at least one of the first electrical switch unit and the second electrical switch unit.

With the control system according to the sixteenth aspect, the operated device can be operated in response to the actuation of at least one of the first electrical switch unit and the second electrical switch unit.

In accordance with a seventeenth aspect of the present disclosure, the control system according to any one of first to sixteenth aspects is configured so that the operated device is a transmission device.

With the control system according to the seventeenth aspect, the control system can be used to control a transmission of a human-powered vehicle.

Also, other objects, features, aspects and advantages of the disclosed control system will become apparent to those skilled in the art from the following detailed description, which, taken in conjunction with the annexed drawings, discloses preferred embodiments of the control system.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the human-powered vehicle field (e.g., the bicycle field) from this disclosure that the following descriptions of the embodiments are provided for illustration only and not for the purpose of limiting the invention as defined by the appended claims and their equivalents.

Figure 1:
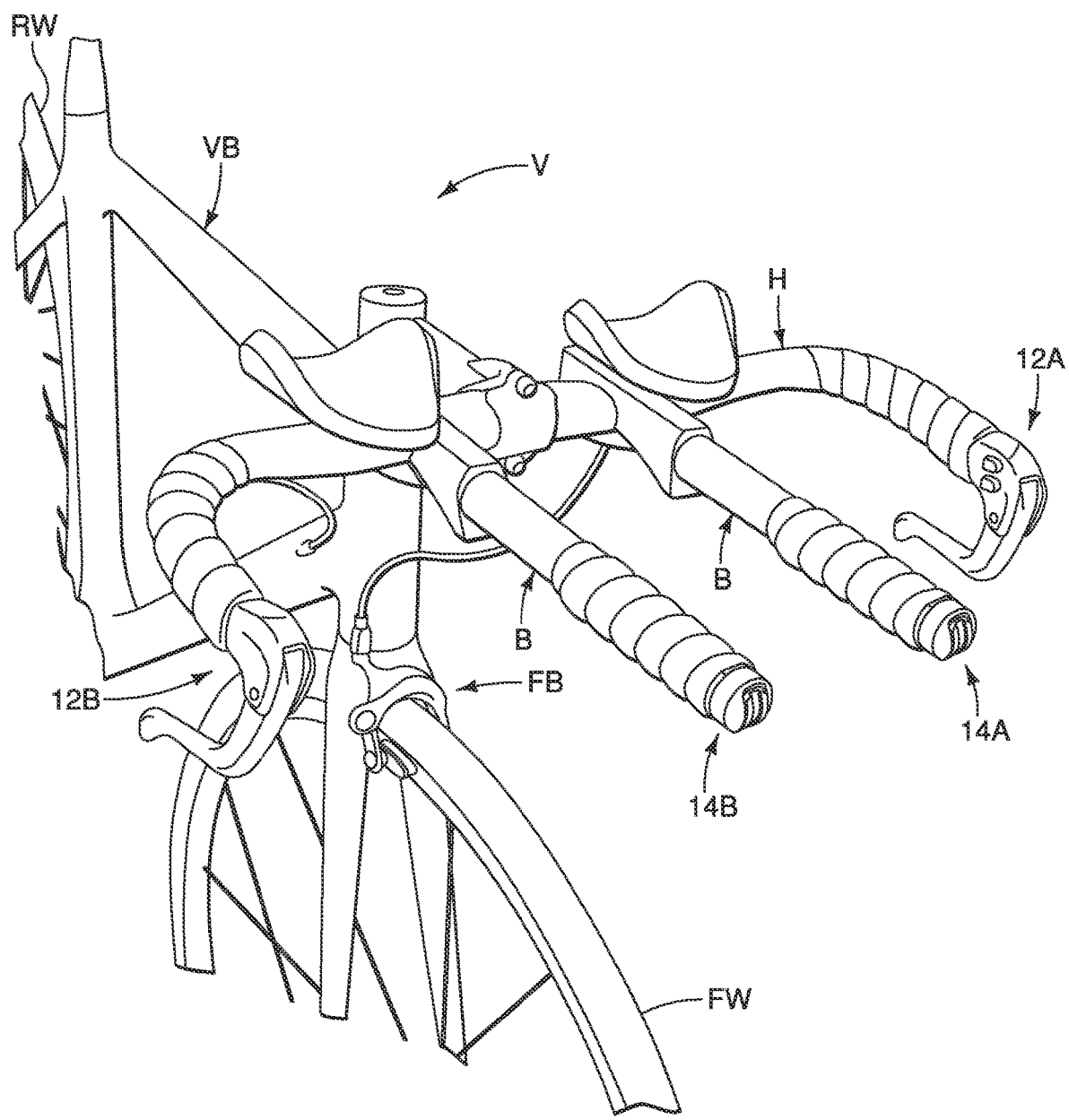
FIG. 1 is a partial perspective view of a human-powered vehicle (e.g., a bicycle) that is equipped with a control system that in accordance with the illustrated embodiments.

Referring initially to FIG. 1, a control system 10 is provided for a human-powered vehicle V that is used with the illustrated embodiments. In the illustrated embodiment, for example, the human-powered vehicle V is a time trial bike. Alternatively, the human-powered vehicle V can be a road bicycle, a city bike, a cargo bike, a recumbent bike, a mountain bike, or another type of off-road bicycle such as a cyclocross bicycle. The number of wheels on the human-powered vehicle V is not limited. The human-powered vehicle V includes, for example, a monocycle and a vehicle having three or more wheels. Here, the human-powered vehicle V is a bicycle that at least partially uses human power as a driving power for traveling and includes an electric drive unit assisting the human power. In particular, a vehicle using solely an internal combustion engine as driving power is not included in the human-powered vehicle of this disclosure. The human-powered vehicle V is configured to support at least one occupant (e.g., a rider or user).

Figure 2:
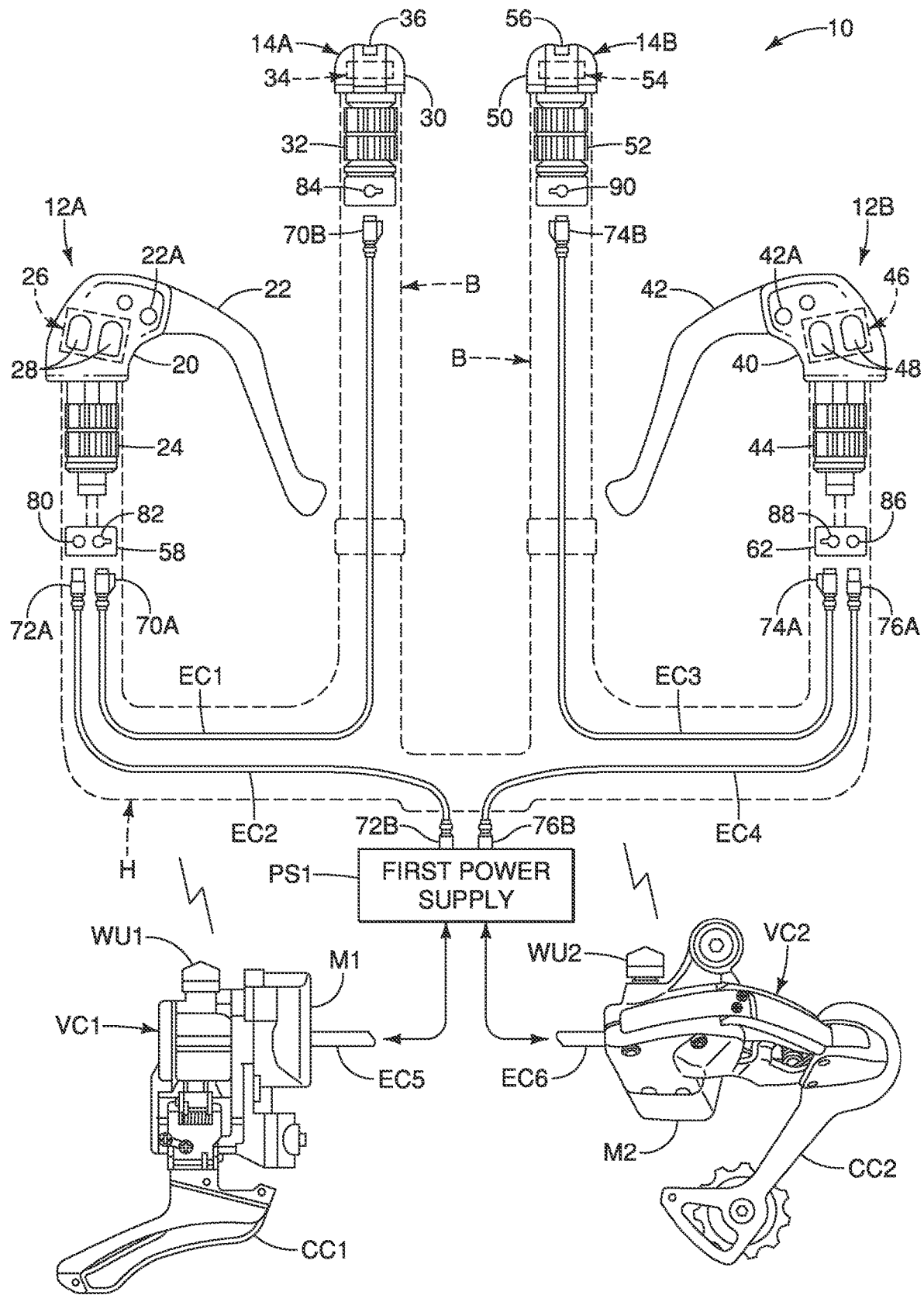
FIG. 2 is a simplified diagrammatic view of the control system in accordance with a first embodiment in which a first operating device and a second operating device are electrically connected such that they share a common wireless communication unit and a common communication wire, and in which a third operating device and a fourth operating device are electrically connected such that they share a common wireless communication unit and a common communication wire.

As seen in FIG. 1, the human-powered vehicle V includes a vehicle body VB having a front fork FF pivotally mounted to a head tube of the vehicle body VB. A handlebar H is attached to the front fork FF for turning or steering a front wheel FW. The handlebar H is illustrated as a time trial or bull horn handlebar. However, the handlebar H is not limited to such a handlebar. For example, the handlebar H can be a drop handlebar of a gravel bike or a road bike. The handlebar H includes a pair of auxiliary handlebars B that are in the form of triathlon aero bars or tribars. As seen in FIG. 1, the control system 10 comprises a first operating device 12A and a second operating device 14A. The first operating device 12A and the second operating device 14A are configured to operate an operated device of the human-powered vehicle V as explained later. Thus, the operated device is a component that is controlled by the control system 10. Here, as seen in FIG. 2, the operated device is a transmission device. In the illustrated embodiment, the control system 10 further comprises a third operating device 12B and a fourth operating device 14B. The third operating device 12B and the fourth operating device 14B are also configured to operate an operated device of the human-powered vehicle V. Here, as seen in FIG. 2, the operated device is also a transmission device.

The first operating device 12A and the third operating device 12B can be called main or primary operating devices, while the second operating device 14A and the fourth operating device 14B can be called satellite operating devices or secondary operating devices. While the human-powered vehicle V is illustrated with four operating devices, the human-powered vehicle V does not require all of the operating devices to carry out the present invention. Rather, the present invention can be carried out with only two of the four operating devices. The first operating device 12A and the third operating device 12B are mounted to the free ends of the handlebar H. The first operating device 12A and the third operating device 12B constitute brake-shift operating devices as discussed below. However, the first operating device 12A and the third operating device 12B are not limited to being used for shifting and braking. The second operating device 14A and the fourth operating device 14B are mounted to the free ends of the auxiliary handlebars B. However, the second operating device 14A and the fourth operating device 14B are not limited to be mounted to the free ends of the auxiliary handlebars B as in the illustrated embodiments. Rather, the second operating device 14A and the fourth operating device 14B can be mounted in a different manner and at different locations as needed and/or desired while still serving the same functions. The second operating device 14A and the fourth operating device 14B constitute shift operating devices as discussed below. However, the second operating device 14A and the fourth operating device 14B are not limited to being used for shifting.

Referring now to FIG. 2, the control system 10 is diagrammatically illustrated with the first operating device 12A and the third operating device 12B to the free ends of the handlebar H and the second operating device 14A and the fourth operating device 14B are mounted to the free ends of the auxiliary handlebars B. As explained below, the first operating device 12A and the second operating device 14A are configured to at least operate a first operated device VC1, while the third operating device 12B and the fourth operating device 14B are configured to at least operate a second operated device VC2. As explained below, the first operating device 12A and the second operating device 14A are configured to at least communicate with the first operated device VC1 via wireless signals or via a communication wire. Similarly, the third operating device 12B and the fourth operating device 14B are configured to at least communicate with the second operated device VC2 via wireless signals or via a communication wire. For carrying out wired communication, the control system 10 is provided with a first power supply P that is directly or indirectly connected to the first operating device 12A, the second operating device 14A, the third operating device 12B, the fourth operating device 14B, the first operated device VC1 and the second operated device VC2. Thus, the electrical wires can be used for supplying power to the connected components as well as for communicating between the connected components.

More specifically, in the illustrated embodiment, the first operated device VC1 is a front derailleur or a first transmission device and a second operated device VC2 is a rear derailleur or a second transmission device. The first operated device VC1 includes a first electric motor M1, a first wireless communication unit WU1 and a first chain cage CC1. Similarly, the second operated device VC2 includes a second electric motor M2, a second wireless communication unit WU2 and a second chain cage CC2. The first operated device VC1 and the second operated device VC2 are conventional devices, and thus, they will not be discussed or illustrated in further detail herein.

Figure 4:
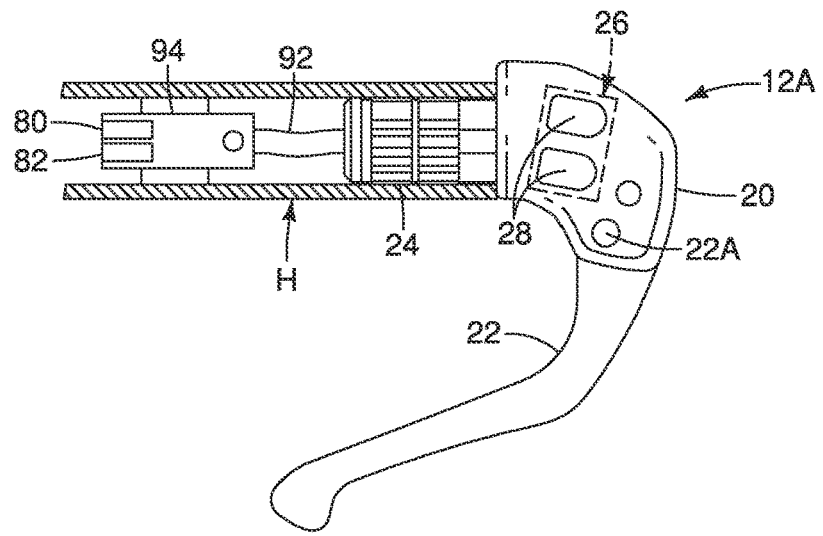
FIG. 4 is a side elevational view of the first operating device of the control system illustrated in FIG. 2 in which the handlebar is shown in cross section to reveal the electrical junction for connecting the electrical cables.

The first operating device 12A basically includes a first base 20, a first operating member 22, a first handlebar attachment 24 and a first electrical switch unit 26. The first handlebar attachment 24 is provided to the first base 20. Here, the first handlebar attachment 24 is attached to one of the free ends of the handlebar H. Preferably, the first handlebar attachment 24 is an expansion type attachment that is inserted into one of the free ends of the handlebar H as seen in FIG. 4. Alternatively, the first handlebar attachment 24 can be an external clamp that is clamped onto an external surface of one of the free ends of the handlebar H.

The first electrical switch unit 26 is coupled to at least one of the first base 20 and the first operating member 22. Here, the first electrical switch unit 26 is coupled the first base 20. Namely, here, the first electrical switch unit 26 is disposed inside a housing of the first base 20. More preferably, the first electrical switch unit 26 is provided on a substrate PCB1 (e.g., a circuit board such as a printed circuit board). Alternatively, the first electrical switch unit 26 is coupled to the first operating member 22.

The first operating device 12A includes at least one first user input 28 that is disposed to at least one the first operating member 22 and the first base 20. The first user input 28 is connected to the first electrical switch unit 26. Here, the first operating device 12A includes two of the first user inputs 28 that are connected to the first electrical switch unit 26. In particular, when an occupant presses on one of the first user inputs 28, a switch of the first electrical switch unit 26 is operated. Thus, the first electrical switch unit 26 includes a pair of switches. The switches of the first electrical switch unit 26 can normally be in an opened state or can normally be in a closed state. In any case, the switches of the first electrical switch unit 26 produce a signal in response to the operation of the first user inputs 28, respectively. The first user inputs 28 are not limited to the push buttons illustrated in FIG. 2, and can include, for example, a toggle switch, a lever, a dial, etc. While the first user inputs 28 are illustrated as be provided on the first base 20, it will be apparent from this disclosure that the first user inputs 28 can be provided at other locations such as on the first operating member 22. In the illustrated embodiment, one of the first user inputs 28 is used for upshifting the first operated device VC1, while the other of the first user inputs 28 is used for downshifting the first operated device VC1.

Here, the first operating member 22 is pivotally mounted to the first base 20. The first operating member 22 is configured to operate a component of the human-powered vehicle V. As seen in FIG. 1, the first operating member 22 is mechanically connected to a front brake device FB via a front brake cable FC. The front brake cable FC is a conventional cable such as a Bowden cable that has an inner wire disposed inside an outer case. Here, the front brake device FB is a cable operated caliper brake. However, the brake device is not limited to a cable operated caliper brake. Alternatively, the brake device can be a disc brake caliper which can be mechanically, hydraulically or electrically operated.

The second operating device 14A includes a second base 30, a second handlebar attachment 32 and a second electrical switch unit 34. The second handlebar attachment 32 is provided to the second base 30. Here, the second handlebar attachment 32 is attached to the free end of one of the auxiliary handlebars B. Preferably, the second handlebar attachment 32 is an expansion type attachment that is inserted into the free end of one of the auxiliary handlebars B. Alternatively, the second handlebar attachment 32 can be an external clamp that is clamped onto an external surface of the free end of one of the auxiliary handlebars B.

The second electrical switch unit 34 is coupled to the second base 30. Preferably, the second electrical switch unit 34 is disposed inside a housing of the second base 30. More preferably, the second electrical switch unit 34 is provided on a substrate PCB2 (e.g., a circuit board such as a printed circuit board). The second operating device 14A includes at least one of a second user input 36 and a second operating member. Here, the second operating device 14A includes only a single one of the second user input 36, and does not include a second operating member. However, the second operating device 14A can be provided with one of additional second user input and/or a second operating member (e.g., a brake lever or some other operating lever). The second operating member can be connected to the front brake device FB in a similar manner as is the first operating member 22 is connected to the front brake device FB. Thus, depending on the configuration of the second operating device 14A, the at least one of the second user input 36 and the second operating member is connected to the second electrical switch unit 34. Here, since the second operating device 14A has only one of the second user input 36, the second electrical switch unit 34 is only operated by the second user input 36. In particular, when an occupant presses on the second user input 36, a switch of the second electrical switch unit 34 is operated. The switch of the second electrical switch unit 34 can normally be in an opened state or can normally be in a closed state. In any case, the switch of the second electrical switch unit 34 produces a signal in response to the operation of the second user input 36. The second user input 36 is not limited to the push button illustrated in FIG. 2, and can include, for example, a toggle switch, a lever, a dial, etc. In the illustrated embodiment, the second user input 36 is used for synchro shifting the first operated device VC1 and the second operated device VC2.

The third operating device 12B is a mirror image of the first operating device 12A. However, the third operating device 12B is electrically connected to the fourth operating device 14B instead of the second operating device 14A. The third operating device 12B basically includes a third base 40, a third operating member 42, a third handlebar attachment 44 and a third electrical switch unit 46. The third handlebar attachment 44 is provided to the third base 40. Here, the third handlebar attachment 44 is attached to one of the free ends of the handlebar H. Preferably, the third handlebar attachment 24 is an expansion type attachment that is inserted into one of the free ends of the handlebar H. Alternatively, the third handlebar attachment 44 can be an external clamp that is clamped onto an external surface of one of the free ends of the handlebar H. The third electrical switch unit 46 is coupled to at least one of the third base 40 and the third operating member 42. Here, the third electrical switch unit 46 is coupled the third base 40. Namely, here, the third electrical switch unit 46 is disposed inside a housing of the third base 40. Alternatively, the third electrical switch unit 46 is coupled to the third operating member 42.

The third operating device 12B includes at least one third user input 48 that is disposed to at least one the third operating member 42 and the third base 40. The third user input 48 is connected to the third electrical switch unit 46. Here, the third operating device 12B includes two of the third user inputs 48 that are connected to the third electrical switch unit 46. In particular, when an occupant presses on one of the third user inputs 48, a switch of the third electrical switch unit 46 is operated. Thus, the third electrical switch unit 46 includes a pair of switches. The switches of the third electrical switch unit 46 can normally be in an opened state or can normally be in a closed state. In any case, the switches of the third electrical switch unit 46 produce a signal in response to the operation of the third user inputs 48, respectively. The third user inputs 48 are not limited to the push buttons illustrated in FIG. 2, and can include, for example, a toggle switch, a lever, a dial, etc. While the third user inputs 48 are illustrated as be provided on the third base 40, it will be apparent from this disclosure that the third user inputs 48 can be provided at other locations such as on the third operating member 42. In the illustrated embodiment, one of the third user inputs 48 is used for upshifting the second operated device VC2, while the other of the third user inputs 48 is used for downshifting the second operated device VC2.

The fourth operating device 14B is identical to the second operating device 14A. However, the fourth operating device 14B is connected to the third operating device 12B instead of the first operating device 12A. The fourth operating device 14B includes a fourth base 50, a fourth handlebar attachment 52 and a fourth electrical switch unit 54. The fourth handlebar attachment 52 is provided to the fourth base 50. Here, the fourth handlebar attachment 52 is attached to the free end of one of the auxiliary handlebars B. Preferably, the fourth handlebar attachment 52 is an expansion type attachment that is inserted into the free end of one of the auxiliary handlebars B. Alternatively, the fourth handlebar attachment 52 can be an external clamp that is clamped onto an external surface of the free end of one of the auxiliary handlebars B.

The fourth electrical switch unit 54 is coupled to the fourth base 50. Preferably, the fourth electrical switch unit 54 is disposed inside a housing of the fourth base 50. More preferably, the fourth electrical switch unit 54 is provided on a substrate PCB4 (e.g., a circuit board such as a printed circuit board). The fourth operating device 14B includes at least one of a fourth user input 56. Here, the fourth operating device 14B includes only a single one of the fourth user input 56. However, the fourth operating device 14B can be provided with one of additional fourth user input and/or an operating member (e.g., a brake lever or some other operating lever). The fourth user input 56 is connected to the fourth electrical switch unit 54. Here, since the fourth operating device 14B has only one of the fourth user input 56, the fourth electrical switch unit 54 is only operated by the fourth user input 56. In particular, when an occupant presses on the fourth user input 56, a switch of the fourth electrical switch unit 54 is operated. The switch of the fourth electrical switch unit 54 can normally be in an opened state or can normally be in a closed state. In any case, the switch of the fourth electrical switch unit 54 produces a signal in response to the operation of the fourth user input 56. The fourth user input 56 is not limited to the push button illustrated in FIG. 2, and can include, for example, a toggle switch, a lever, a dial, etc. In the illustrated embodiment, the fourth user input 56 is used for synchro shifting the first operated device VC1 and the second operated device VC2.

Figure 3:
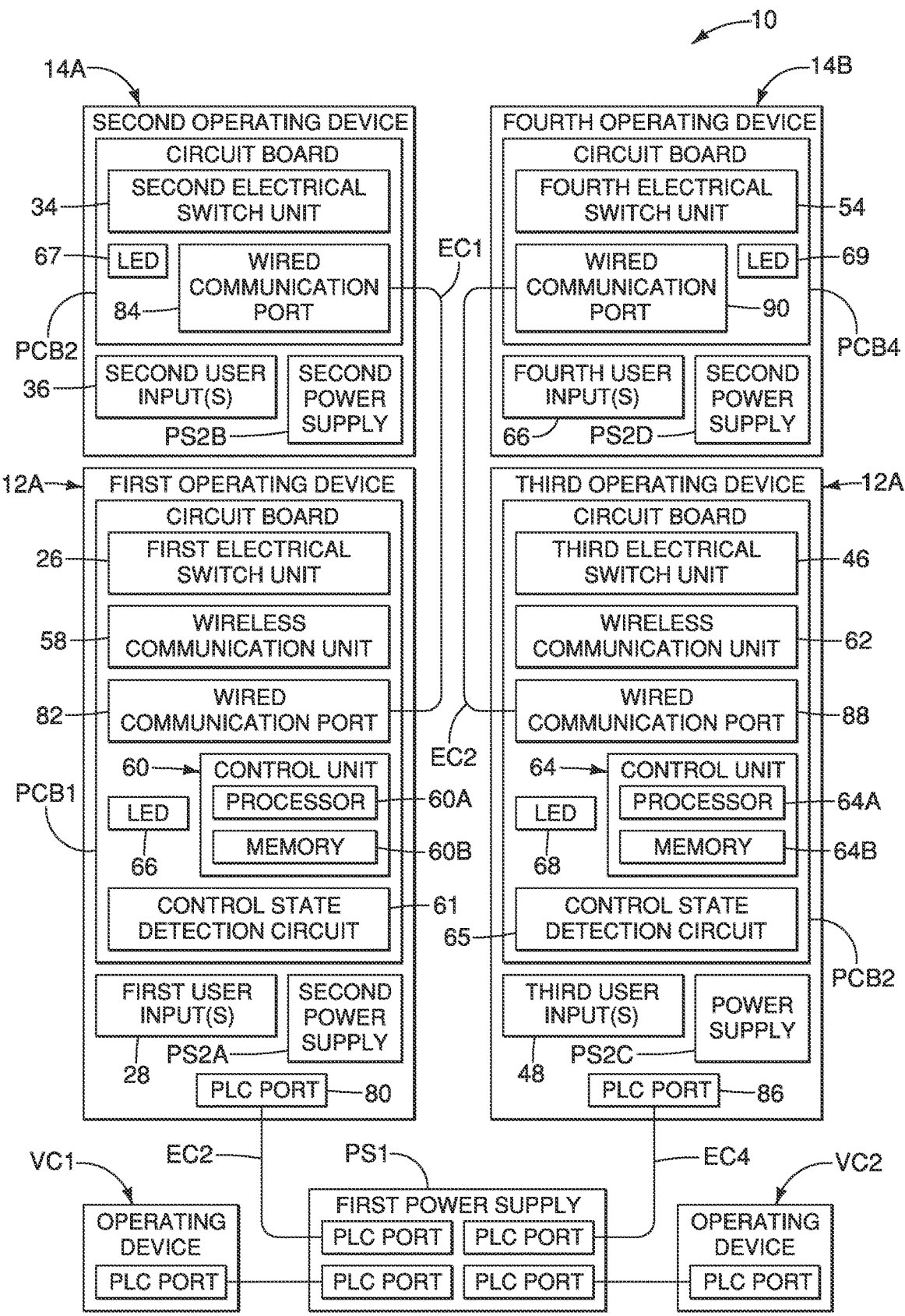
FIG. 3 is a schematic block diagram of the basic components of the control system illustrated in FIG. 2.

Referring now to FIG. 3, the control system 10 further comprises a wireless communication unit 58 and a control unit 60. Here, the wireless communication unit 58 and the control unit 60 are provided to the first operating device 12A. Also, here, the control unit 60 is configured to either wirelessly communicate or communicate by wire the signals produced by the first operating device 12A and the second operating device 14A in accordance with a control state of the control unit 60 as explained below.

The wireless communication unit 58 is configured to output wireless control signals to the first operating device 12A and the second operating device 14A. Thus, the wireless communication unit 58 is at least configured to transmit signals. The term "wireless communication unit" as used herein includes a transmitter, a transceiver, a transmitter-receiver, and contemplates any device or devices, separate or combined, capable of transmitting and/or receiving wireless communication signals, including shift signals or control, command or other signals related to some function of the component being controlled. The wireless communication signals can be radio frequency (RF) signals, ultra-wide band communication signals, ANT+ communications, or Bluetooth® communications or any other type of signal suitable for short range wireless communications as understood in the human-powered vehicle field. Here, the wireless communication unit 58 can be a one-way wireless communication device such as a transmitter. More preferably, the wireless communication unit 58 is a transceiver that is also configured to receive signals.

The wireless communication unit 58 is disposed on at least one of the first operating device 12A, the second operating device 14A and the control unit 60. Here, the wireless communication unit 58 and the control unit 60 are provided to the first operating device 12A. However, as explained below, the control system 10 is not limited to this arrangement of the wireless communication unit 58 and the control unit 60. For example, the wireless communication unit 58 and the control unit 60 can be provided to a component other than the first operating device 12A and the second operating device 14A such as a junction box that is remotely located from the first operating device 12A and the second operating device 14A. Also, the wireless communication unit 58 and the control unit 60 do not need to be provided to the same component. In any case, the wireless communication unit 58 is electrically connected to the first operating device 12A and the second operating device 14A. Thus, the wireless communication unit 58 provides wireless communications for both the first operating device 12A and the second operating device 14A to the first operated device VC1.

Namely, the control unit 60 is configured to selectively control the wireless communication unit 58 to establish wireless communication with the operated device (e.g., the first operated device VC1) in accordance with a control state of the control unit 60. Thus, in the illustrated embodiment, the control unit 60 is configured to selectively transmit signal in accordance with actuation of at least one of the first electrical switch unit 26 and the second electrical switch unit 34. Here, the control unit 60 is configured to selectively transmit signal in accordance with actuation of the first electrical switch unit 26 and the second electrical switch unit 34. However, it will be apparent from this disclosure that each of the first operating device 12A and the second operating device 14A can be provided with its own control unit.

The control unit 60 can be described as circuitry that is provided on the substrate PCB1. The control unit 60 can be define as a controller that can receive, process, analyze, interpret, and/or communicate signals. The term "control unit 60" as used herein refers to hardware that executes a software program, and does not include a human. In any case, the control unit 60 is preferably a microcomputer that includes at least one processor 60A (i.e., a central processing unit) and at least one memory 60B (i.e., a computer storage device). The processor 60A can be one or more integrated circuits having firmware for causing the circuitry to complete the activities described herein. The memory 60B is any computer storage device or any non-transitory computer-readable medium with the sole exception of a transitory, propagating signal. For example, the memory can include nonvolatile memory and volatile memory, and can includes a ROM (Read Only Memory) device, a RAM (Random Access Memory) device, a hard disk, a flash drive, etc. Here, the substrate PCB1 of the control unit 60 includes one or more semiconductor chips that include the first electrical switch unit 26, the wireless communication unit 58, the processor 60A, and the memory 60B.

The control system 10 further comprises a detector 61 that is configured to detect information of the control state. The term "detector" as used herein refers to a hardware device or software designed to detect a parameter for determining whether to select controlling the operated device by wireless communication or wired communication. The term "detector" as used herein do not include a human. For example, the detector 64 can be a detection circuit that detects presence, absence and/or the level of electric power from the first power supply PS1 as indicated in FIG. 3, software that executes a program to detect the presence or absence of electric power from the first power supply PS1, a port sensor that detects the presence or absence of electrical cable in a port, software that executes a program to detect port activity, etc.

Still referring to FIG. 3, the control system 10 further comprises a wireless communication unit 62 and a control unit 64. While the wireless communication unit 62 and the control unit 64 are illustrated as being provided on the substrate PCB2, the wireless communication unit 62 and the control unit 64 can be provided at different locations and/or different portion of the control system 10 as needed and/or desired. Here, the wireless communication unit 62 and the control unit 64 are provided to the third operating device 12B. Also, here, the control unit 64 is configured to either wirelessly communicate or communicate by wire the signals produced by the third operating device 12B and the fourth operating device 14B in accordance with a control state of the control unit 64 as explained below.

The wireless communication unit 62 is configured to output wireless control signals to the third operating device 12B and the fourth operating device 14B. Thus, the wireless communication unit 62 is at least configured to transmit signals. The wireless communication signals can be radio frequency (RF) signals, ultra-wide band communication signals, ANT+ communications, or Bluetooth® communications or any other type of signal suitable for short range wireless communications as understood in the human-powered vehicle field. Here, the wireless communication unit 62 can be a one-way wireless communication device such as a transmitter. More preferably, the wireless communication unit 62 is a transceiver that is also configured to receive signals.

The wireless communication unit 62 is disposed on at least one of the third operating device 12B, the fourth operating device 14B and the control unit 64. Here, the wireless communication unit 62 and the control unit 64 are provided to the third operating device 12B. However, as explained below, the control system 10 is not limited to this arrangement of the wireless communication unit 62 and the control unit 64. For example, the wireless communication unit 62 and the control unit 64 can be provided to a component other than the third operating device 12B and the fourth operating device 14B such as a junction box that is remotely located from the third operating device 12B and the fourth operating device 14B. Also, the wireless communication unit 62 and the control unit 64 do not need to be provided to the same component. In any case, the wireless communication unit 62 is electrically connected to the third operating device 12B and the fourth operating device 14B. Thus, the wireless communication unit 62 provides wireless communications for both the third operating device 12B and the fourth operating device 14B to the second operated device VC2. Namely, the control unit 64 is configured to selectively control the wireless communication unit 62 to establish wireless communication with the operated device (e.g., the second operated device VC2) in accordance with a control state of the control unit 64. Here, the control unit 64 is configured to selectively transmit signal in accordance with actuation of the first electrical switch unit 26 and the second electrical switch unit 34. However, it will be apparent from this disclosure that each of the third operating device 12B and the fourth operating device 14B can be provided with its own control unit.

The control unit 64 can be described as circuitry that is provided on the substrate PCB3. The control unit 64 can be define as a controller that can receive, process, analyze, interpret, and/or communicate signals. In any case, the control unit 64 is preferably a microcomputer that includes at least one processor 64A (i.e., a central processing unit) and at least one memory 64B (i.e., a computer storage device). The processor 64A can be one or more integrated circuits having firmware for causing the circuitry to complete the activities described herein. The memory 64B is any computer storage device or any non-transitory computer-readable medium with the sole exception of a transitory, propagating signal. For example, the memory can include nonvolatile memory and volatile memory, and can includes a ROM (Read Only Memory) device, a RAM (Random Access Memory) device, a hard disk, a flash drive, etc. Here, the substrate PCB1 of the control unit 64 includes one or more semiconductor chips that include the third electrical switch unit 46, the wireless communication unit 62, the processor 64A, and the memory 64B.

The control system 10 further comprises a detector 65 that is configured to detect information of the control state. The term "detector" as used herein refers to a hardware device or software designed to detect a parameter for determining whether to select controlling the operated device by wireless communication or wired communication. The term "detector" as used herein do not include a human. For example, the detector 64 can be a detection circuit that detects presence, absence and/or the level of electric power from the first power supply PS1 as indicated in FIG. 3, software that executes a program to detect the presence or absence of electric power from the first power supply PS1, a port sensor that detects the presence or absence of electrical cable in a port, software that executes a program to detect port activity, etc.

The control system 10 further comprises a notification unit configured to notify the control state. Here, the each of the first operating device 12A, the second operating device 14A, the third operating device 12B and the fourth operating device 14B are provided with a notification unit. In particular, the first operating device 12A includes an illumination device 66 (e.g., LED) as a notification unit. The second operating device 14A includes an illumination device 67 (e.g., LED) as a notification unit. The third operating device 12B includes an illumination device 68 (e.g., LED) as a notification unit. The fourth operating device 14B includes an illumination device 69 (e.g., LED) as a notification unit. The illumination devices 69 can be configured to display different colors to indicate the different control states, and/or blink at different rates to indicate the different control states. Preferably, the notification units (the illumination devices 66 to 69) provide notification of whether the first operating device 12A, the second operating device 14A, the third operating device 12B and the fourth operating device 14B, respectively, are in a wireless communication exchange mode or in a wired communication exchange mode. For example, the illumination devices 66 to 69 can be illuminated with a green light where the correspond one of the operating devices is in the wireless communication exchange mode, and be illuminated with a red light where the correspond one of the operating devices is in the wired communication exchange mode. Also, for example, the illumination devices 66 to 69 can be continuously luminated when the power supply condition is above a prescribed level, and can be blinking when the power supply condition is equal to or below a prescribed level. Of course, it will be apparent from this disclose that other types of notification units (e.g., audible notification units, haptic notification units, etc.) can be used instead of or in conjunction with one or more visuals notification units as needed and/or desired. Also, other information can be conveyed to the occupant using one or more notification units as needed and/or desired.

FIG. 2 also schematically illustrate the electrical arrangement of the control system 10. The second operating device 14A is electrically connected to the first operating device 12A. The fourth operating device 14B is electrically connected to the third operating device 12B. In this way, the first operating and second operating device 14A can be used to operate the first operated device VC1, while the third operating device 12B and the fourth operating device 14B can be used to operate the second operated device VC2.

In particular, the first operating device 12A is electrically connected to the second operating device 14A by a first electrical cable EC1, and electrically connected to the first power supply PS1 by a second electrical cable EC2. The first electrical cable EC1 is a three pin communication cable that is capable of transmitting data signals, while the second electrical cable EC2 is a power line communication cable that is capable of transmitting data signals and electric power. Here, the first electrical cable EC1 includes a first electrical connector 70A provided at a first end of the first electrical cable EC1 and a second electrical connector 70B provided at a second end of the first electrical cable EC1. The first electrical connector 70A is configured to be electrically connecting to the first operating device 12A in a releasable and reattachable manner without using tools. The second electrical connector 70B is configured to be electrically connecting to the second operating device 14A in a releasable and reattachable manner without using tools. Similarly, the second electrical cable EC2 includes a first electrical connector 72A provided at a first end of the second electrical cable EC2 and a second electrical connector 72B provided at a second end of the second electrical cable EC2. The first electrical connector 72A is configured to be electrically connecting to the first operating device 12A in a releasable and reattachable manner without using tools. The second electrical connector 72B is configured to be electrically connecting to the first power supply PS1 in a releasable and reattachable manner without using tools.

Similarly, the third operating device 12B is electrically connected to the fourth operating device 14B by a third electrical cable EC3, and electrically connected to a first power supply PS1 by a fourth electrical cable EC4. The third electrical cable EC3 is a three pin communication cable that is capable of transmitting data signals, while the fourth electrical cable EC4 is a power line communication cable that is capable of transmitting data signals and electric power. Here, the third electrical cable EC3 includes a first electrical connector 74A provided at a first end of the third electrical cable EC3 and a second electrical connector 74B provided at a second end of the third electrical cable EC3. The first electrical connector 74A is configured to be electrically connecting to the third operating device 12B in a releasable and reattachable manner without using tools. The second electrical connector 74B is configured to be electrically connecting to the fourth operating device 14B in a releasable and reattachable manner without using tools. Similarly, the fourth electrical cable EC4 includes a first electrical connector 76A provided at a first end of the fourth electrical cable EC4 and a second electrical connector 76B provided at a second end of the fourth electrical cable EC4. The first electrical connector 76A is configured to be electrically connecting to the third operating device 12B in a releasable and reattachable manner without using tools. The second electrical connector 76B is configured to be electrically connecting to the first power supply PS1 in a releasable and reattachable manner without using tools.

More specifically, in the illustrated embodiment, the first power supply PS1 is electrically connected to a first operated device VC1 by a fifth electrical cable EC5, and electrically connected to a second operated device VC2 by a sixth electrical cable EC6. The fifth electrical cable EC5 and the sixth electrical cable EC6 can include electrical connectors at each end similar to the first electrical cable EC1.

In the first embodiment, the control system 10 further comprises a wired communication port 80 that is electrically connected to the control unit 60 for selectively connecting the first operating device 12A and the second operating device 14A to the first operated device VC1 via the second electrical cable EC2. In particular, the control unit 60 is electrically connected to the first power supply PS1 by the second electrical cable EC2, and the first power supply PS1 is electrically connected to the first operated device VC1 by the fifth electrical cable EC5. In this way, the control unit 60 receives electric power from the first power supply PS1 and transmits signals to the first power supply PS1 via power line communication (PLC). Alternatively, the control unit 60 can be directly connected to the first operated device VC1 by an electrical cable to directly communicate with the first operated device VC1 via power line communication (PLC). Also, alternatively, the control unit 60 can be connected to the first operated device VC1 by a dedicated signal wire.

In the first embodiment, the control unit 60 is configured to selectively transmit control signals to the first operated device VC1 either wirelessly using the wireless communication unit 58 or via power line communication (PLC) using the second electrical cable EC2. In other words, the control state of the control unit 60 depends on whether the control unit 60 transmits control signals to the first operated device VC1 either wirelessly or via power line communication (PLC). In the first embodiment, the control state includes a first control state where the wired communication port 80 is electrically connected to the second electrical cable EC2, and a second control state where the wired communication port 80 is free from electrically connecting to the second electrical cable EC2. In this way, the control unit 60 is configured to establish wired communication, where the first operating device 12A and the second operating device 14A are electrically connected to the first operated device VC1 via the second electrical cable EC2 in the first control state. Namely, in the first embodiment, the first operated device VC1 is electrically connected to the first operating device 12A via the fifth electrical cable EC5, the first power supply PS1 and the second electrical cable EC2, while the second operating device 14A is electrically connected to the first operated device VC1 via the first electrical cable EC1 being electrically connected to the control unit 60 that is electrically connected to the second electrical cable EC2. On the other hand, the control unit 60 is configured to establish the wireless communication in the second control state.

When the second electrical cable EC2 is plugged into the wired communication port 80, the control unit 60 is further configured to control electric power supplied from the first power supply PS1 to the first operating device 12A and the second operating device 14A in the first control state. Also, when the second electrical cable EC2 is plugged into the wired communication port 80, the first power supply PS1 is connected to at least one of the first operating device 12A, the second operating device 14A and the control unit 60. Namely, in the first embodiment, the first power supply PS1 is electrically connected to the first operating device 12A and the control unit 60 via the second electrical cable EC2, and is electrically connected to the second operating device 14A via the control unit 60 and the first electrical cable EC1.

When the second electrical cable EC2 is not plugged into the wired communication port 80, the control unit 60 is further configured to control electric power supplied from a second power supply PS2A such that the first operating device 12A and the second operating device 14A are wirelessly in communication with the first operated device VC1 via the wireless communication unit 58 in the second control state. In other words, the control unit 60 controls the supply of the electric power from the second power supply PS2A to the first operating device 12A and the second operating device 14A so that the control signals from the first operating device 12A and the second operating device 14A can be wirelessly transmitted from the wireless communication unit 58. Here, the second operating device 14A is also provide with a second power supply PS2B, which is controlled by the control unit 60. In the way, the control unit 60 can supply of the electric power from either the second power supply PS2A or the second power supply PS2B, or both, to the first operating device 12A and the second operating device 14A so that the control signals from the first operating device 12A and the second operating device 14A can be wirelessly transmitted from the wireless communication unit 58. The second power supply PS2A is disposed to at least one of the first operating device 12A, the second operating device 14A, the control unit 60 and the wireless communication unit 58. Here, in the first embodiment, the first operating device 12A includes the second power supply PS2A, while the second operating device 14A includes a second power supply PS2B. Each of the second power supply PS2A and the second power supply PS2B can be a capacitor, a coin battery or a rechargeable battery.

In the first embodiment, the first operating device 12A further includes an electrical connecting port 82 for receiving the first electrical connector 70A of the first electrical cable EC1 in a pluggable and unpluggable manner. Also, in the first embodiment, the second operating device 14A includes an electrical connecting port 84 for receiving the second electrical connector 70B of the first electrical cable EC1 in a pluggable and unpluggable manner. However, one ends of the first electrical cable EC1 can be directly wired to either the first operating device 12A and the second operating device 14A, or the ends of the first electrical cable EC1 can be directly wired to the first operating device 12A and the second operating device 14A. Preferably, at least one of the first operating device 12A and the second operating device 14A includes an electrical connecting port (either the electrical connecting port 82 or the electrical connecting port 84). In such a case, the other one of the first operating device 12A and the second operating device 14A includes the electrical connector (either the first electrical connector 70A or the second electrical connector 70B) that is coupled into the electrical connecting port (either the electrical connecting port 82 or the electrical connecting port 84). In this way, in the first embodiment, the first operating device 12A and the second operating device 14A are electrically connected such that they share the wireless communication unit 58 and the second electrical cable EC2 as a communication wire for communicating with the first operated device VC1.

In the first embodiment, the control system 10 further comprises a wired communication port 86 as seen in FIG. 3. While the wired communication port 86 is illustrated as being provided in the third operating device 12B, the wired communication port 86 can be provided at different locations and/or different portion of the control system 10 as needed and/or desired. Thus, for example, the wired communication port 86 does not need to be integrated with the wireless communication unit 62 and/or the control unit 64. Rather the wired communication port 86 can be provided at different locations and/or different portion of the control system 10 as needed and/or desired. The wired communication port 86 is electrically connected to the control unit 64 for selectively connecting the third operating device 12B and the fourth operating device 14B to the second operated device VC2 via the fourth electrical cable EC4. In particular, the control unit 64 is electrically connected to the first power supply PS1 by the fourth electrical cable EC4, and the first power supply PS1 is electrically connected to the second operated device VC2 by the sixth electrical cable EC6. In this way, the control unit 64 receives electric power from the first power supply PS1 and transmits signals to the first power supply PS1 via power line communication (PLC). Alternatively, the control unit 64 can be directly connected to the second operated device VC2 by an electrical cable to directly communicate with the second operated device VC2 via power line communication (PLC). Also, alternatively, the control unit 64 can be connected to the second operated device VC2 by a dedicated signal wire.

In the first embodiment, the control unit 64 is configured to selectively transmit control signals to the second operated device VC2 either wirelessly using the wireless communication unit 62 or via power line communication (PLC) using the fourth electrical cable EC4. In other words, the control state of the control unit 64 depends on whether the control unit 64 transmits control signals to the second operated device VC2 either wirelessly or via power line communication (PLC). In the first embodiment, the control state includes a first control state where the wired communication port 86 is electrically connected to the fourth electrical cable EC4, and a second control state where the wired communication port 86 is free from electrically connecting to the fourth electrical cable EC4. In this way, the control unit 64 is configured to establish wired communication, where the third operating device 12B and the fourth operating device 14B are electrically connected to the second operated device VC2 via the fourth electrical cable EC4 in the first control state. Namely, in the first embodiment, the second operated device VC2 is electrically connected to the third operating device 12B via the sixth electrical cable EC6, the first power supply PS1 and the fourth electrical cable EC4, while the fourth operating device 14B is electrically connected to the second operated device VC2 via the third electrical cable EC3 being electrically connected to the control unit 64 that is electrically connected to the fourth electrical cable EC4. On the other hand, the control unit 64 is configured to establish the wireless communication in the second control state.

When the fourth electrical cable EC4 is plugged into the wired communication port 86, the control unit 64 is further configured to control electric power supplied from the first power supply PS1 to the third operating device 12B and the fourth operating device 14B in the first control state. Also, when the fourth electrical cable EC4 is plugged into the wired communication port 86, the first power supply PS1 is connected to at least one of the third operating device 12B, the fourth operating device 14B and the control unit 64. Namely, in the first embodiment, the first power supply PS1 is electrically connected to the third operating device 12B and the control unit 64 via the fourth electrical cable EC4, and is electrically connected to the fourth operating device 14B via the control unit 64 and the third electrical cable EC3.

When the fourth electrical cable EC4 is not plugged into the wired communication port 86, the control unit 64 is further configured to control electric power supplied from a second power supply PS2C of the third operating device 12B and/or a second power supply PS2D of the fourth operating device 14B. In this way, the control unit 64 controls electric power supplied from the second power supply PS2C and/or the second power supply PS2D for wirelessly communing with the second operated device VC2 via the wireless communication unit 62 in the second control state. In other words, the control unit 64 controls the supply of the electric power from the second power supply PS2C and/or the second power supply PS2D so that the control signals from the third operating device 12B and the fourth operating device 14B can be wirelessly transmitted from the wireless communication unit 62. Each of the second power supply PS2C and the second power supply PS2D can be a capacitor, a coin battery or a rechargeable battery.

Similarly, the third operating device 12B further includes an electrical connecting port 88 for receiving the first electrical connector 74A of the third electrical cable EC3 in a pluggable and unpluggable manner as seen in FIG. 2. While the electrical connecting port 88 is illustrated in FIG. 3 as being provided on the substrate PCB2, the electrical connecting port 88 can be provided at different locations and/or different portion of the control system 10 as needed and/or desired. Thus, for example, the wired electrical connecting port 88 does not need to be integrated with the wireless communication unit 62 and/or the control unit 64. Rather the electrical connecting port 88 can be provided at different locations and/or different portion of the control system 10 as needed and/or desired. Also, in the first embodiment, the fourth operating device 14B includes an electrical connecting port 90 for receiving the second electrical connector 74B of the third electrical cable EC3 in a pluggable and unpluggable manner. In this way, in first embodiment, the third operating device 12B and the fourth operating device 14B are electrically connected such that they share the wireless communication unit 62 and the fourth electrical cable EC4 as a communication wire for communicating with the first operated device VC1.

Referring now to FIG. 4, the first operating device 12A has an electrical cable 92 that electrically connects the first electrical switch unit 26 (i.e., the circuit board PCB1 of FIG. 3) to an electrical connector case 94. Here, the electrical connector case 94 includes both the wired communication port 80 and the electrical connecting port 82 in a single unit that is resiliently supported inside the handlebar H by a fixing and/or cushioning material such as a rubber, sponge etc. The electrical cable 92 includes an outer sheath that covers a first voltage wire and a first ground wire electrically connected to the wired communication port 80, and a second voltage wire and a second ground wire electrically connected to the electrical connecting port 82.

Figure 5:
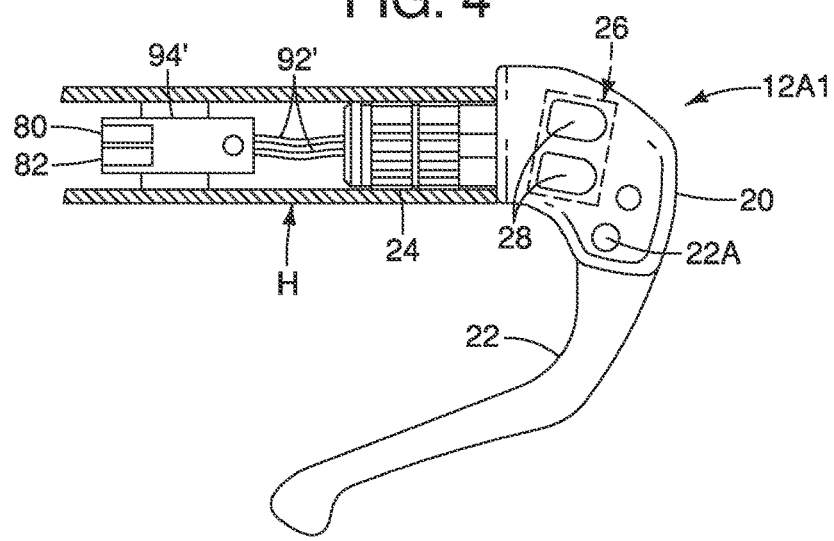
FIG. 5 is a side elevational view of the first operating device of the control system illustrated in FIG. 2 in which the handlebar is shown in cross section to reveal a first modification of the electrical connection of the electrical junction for connecting the electrical cables.

Referring now to FIG. 5, a first operating device 12A1 is illustrated in accordance with a first modification. Here, the first operating device 12A1 is identical to the first operating device 12A1 except that two electrical cables 92' are used to electrically connect the first electrical switch unit 26 (i.e., the circuit board PCB1 of FIG. 3) to an electrical connector case 94'. Here, the electrical connector case 94' includes both the wired communication port 80 and the electrical connecting port 82 in a single unit that is resiliently supported inside the handlebar H. One of the electrical cables 92' is electrically connected to the wired communication port 80 and the other of the electrical cables 92' is electrically connected to the electrical connecting port 82. Each of the electrical cables 92 includes an outer sheath that covers a single voltage wire and a single ground wire.

Figure 6:
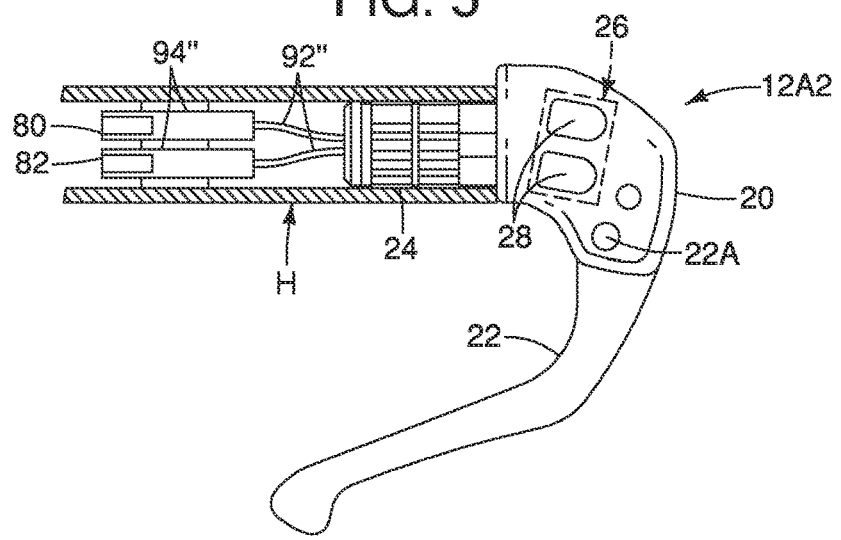
FIG. 6 is a side elevational view of the first operating device of the control system illustrated in FIG. 2 in which the handlebar is shown in cross section to reveal a second modification of the electrical junction for connecting the electrical cables.

Referring now to FIG. 6, a first operating device 12A2 is illustrated in accordance with a second modification. Here, the first operating device 12A1 is identical to the first operating device 12A1 except that two electrical cables 92" and two electrical junctions 94" are used instead of a single electrical cable and a single electrical junction. Thus, one of the electrical junctions 94' supports the wired communication port 80, while the other of the electrical junctions 94' supports the electrical connecting port 82. Also, one of the electrical cables 92" electrically connects the first electrical switch unit 26 (i.e., the circuit board PCB1 of FIG. 3) to the wired communication port 80, while the other of the electrical cables 92" electrical connects the first electrical switch unit 26 (i.e., the circuit board PCB1 of FIG. 3) to the electrical connecting port 82. Each of the electrical cables 92" includes an outer sheath that covers a single voltage wire and a single ground wire.

Figure 7:
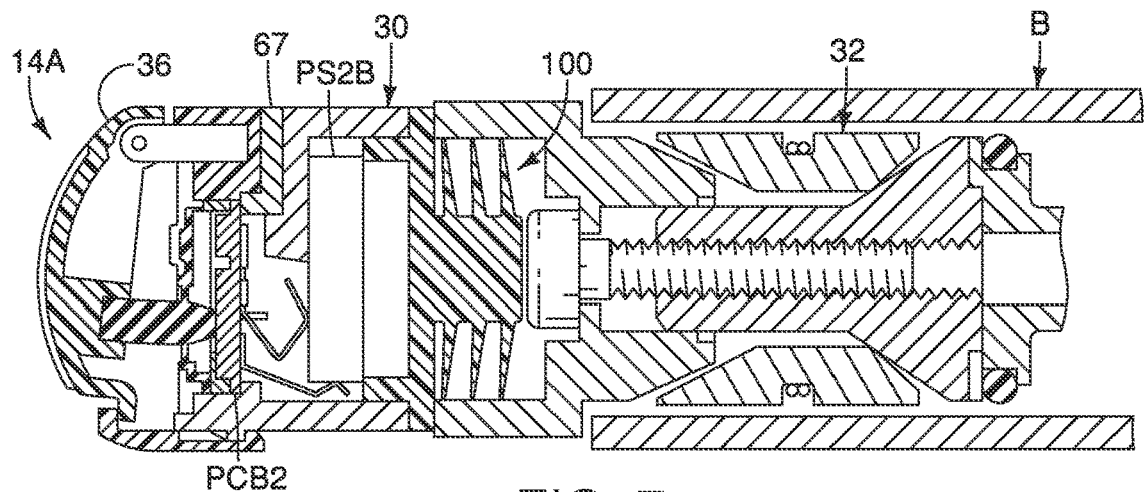
FIG. 7 is a cross sectional view of the second operating device of the control system illustrated in FIG. 2.

Referring now to FIG. 7, the second operating device 14A is illustrated in cross section. Here, the second base 30 is connected to the second handlebar attachment 32 using a grommet connector 100 that is press-fitted into a recess in the second handlebar attachment 32. The grommet connector 100 is provided with a hole for an electrical cable to pass therethrough to electrically connect the circuit board PCB2 to the electrical connecting port 84.

Figure 8:
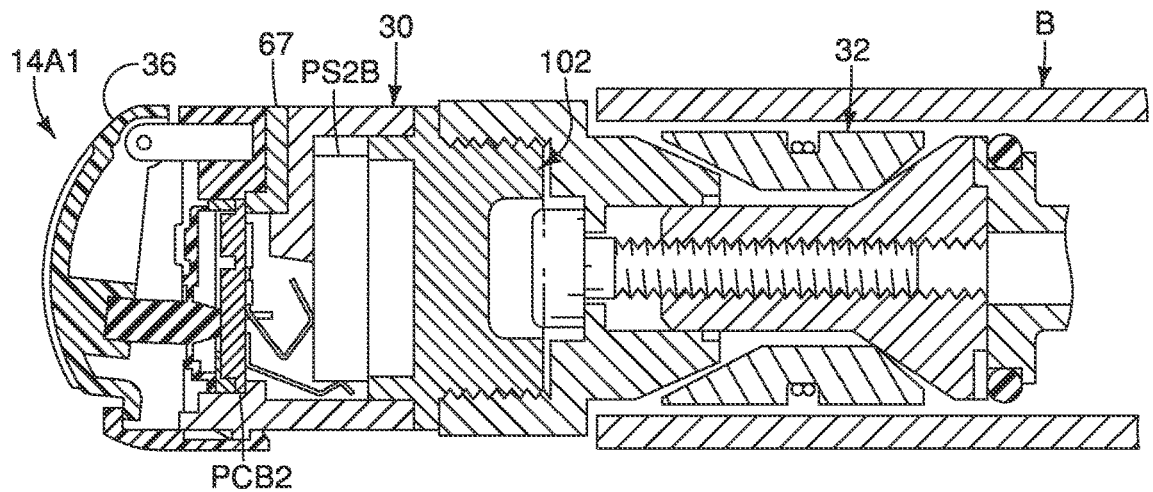
FIG. 8 is a cross sectional view of the second operating device with a first modification of the mechanical connection between the second base and the second handlebar attachment structure of the second operating device.

Referring now to FIG. 8, a second operating device 14A1 is illustrated in cross section in accordance with a first modification. Here, the second base 30 is connected to the second handlebar attachment 32 using a screw connector 102 that screwed into a threaded recess in the second handlebar attachment 32. The screw connector 102 is provided with a hole for an electrical cable to pass therethrough to electrically connect the circuit board PCB2 to the electrical connecting port 84.

Figure 9:
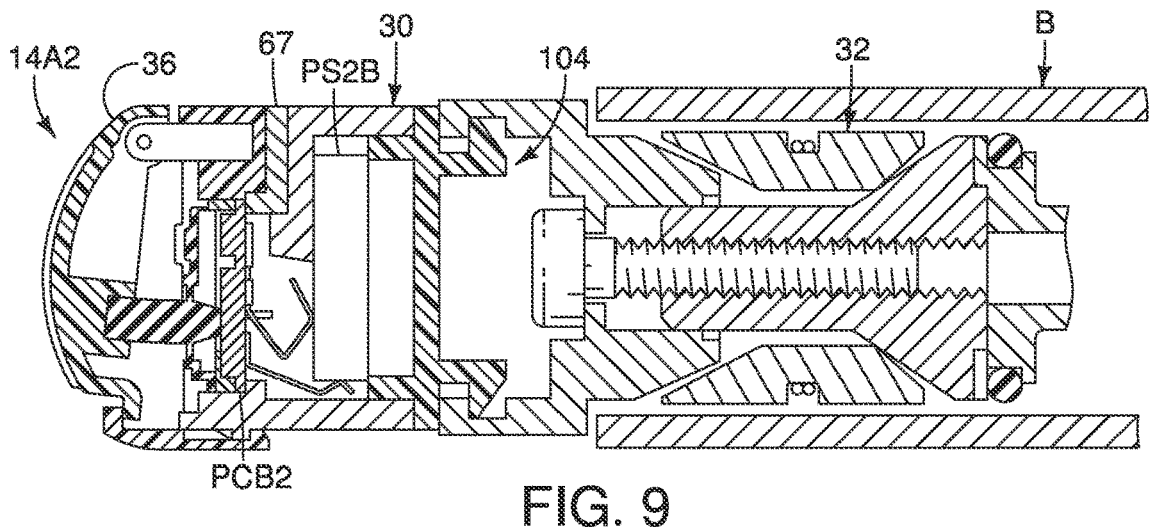
FIG. 9 is a cross sectional view of the second operating device with a second modification of the mechanical connection between the second base and the second handlebar attachment structure of the second operating device.

Referring now to FIG. 9, a second operating device 14A2 is illustrated in cross section in accordance with a second modification. Here, the second base 30 is connected to the second handlebar attachment 32 using a snap-fit connector 104 that snap-fitted into a recess in the second handlebar attachment 32. The screw connector 104 is provided with a hole for an electrical cable to pass therethrough to electrically connect the circuit board PCB2 to the electrical connecting port 84.

Figure 10:
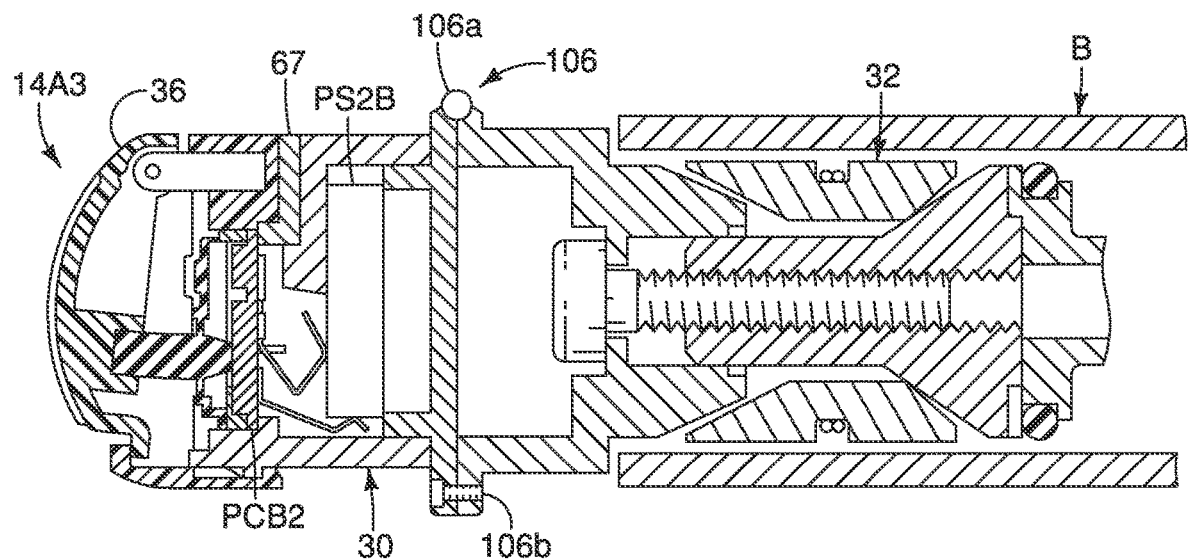
FIG. 10 is a cross sectional view of the second operating device with a third modification of the mechanical connection between the second base and the second handlebar attachment structure of the second operating device.

Referring now to FIG. 10, a second operating device 14A3 is illustrated in cross section in accordance with a third modification. Here, the second base 30 is connected to the second handlebar attachment 32 using a hinge connector 106 for hingedly coupling the second base 30 to the second handlebar attachment 32. The hinge connector 106 includes a hinge 106a and a fastener 106b. The hinge connector 106 is provided with a hole for an electrical cable to pass therethrough to electrically connect the circuit board PCB2 to the electrical connecting port 84.

Figure 11:
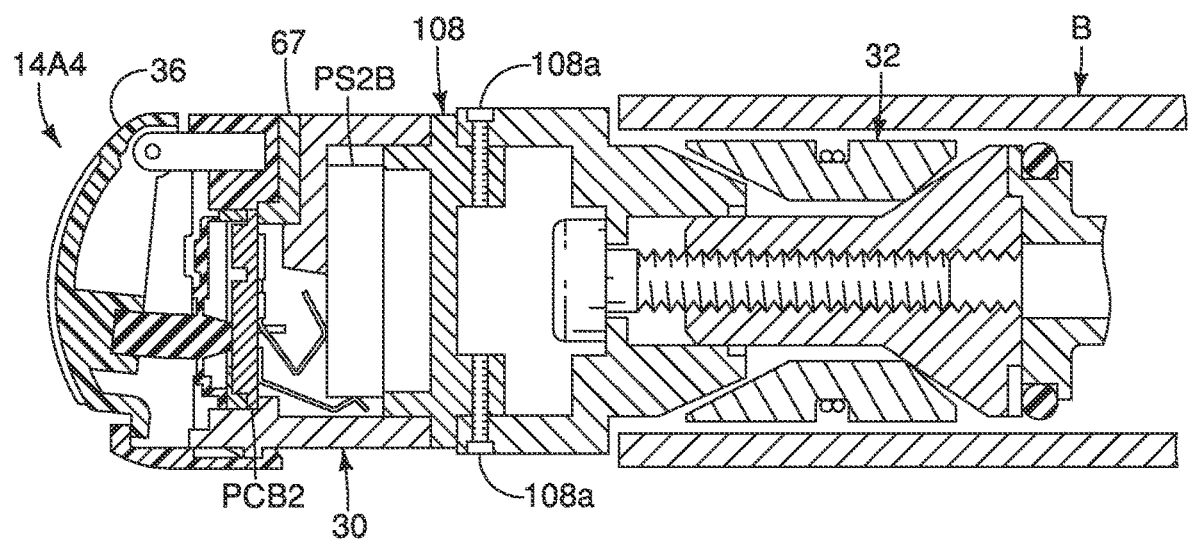
FIG. 11 is a cross sectional view of the second operating device with a fourth modification of the mechanical connection between the second base and the second handlebar attachment structure of the second operating device.

Referring now to FIG. 11, a second operating device 14A3 is illustrated in cross section in accordance with a third modification. Here, the second base 30 is connected to the second handlebar attachment 32 using a bolted connector 108 for fixedly coupling the second base 30 to the second handlebar attachment 32. The bolted connector 108 includes a plurality of bolts 110 fastening the second base 30 to the second handlebar attachment 32. The bolted connector 108 is provided with a hole for an electrical cable to pass therethrough to electrically connect the circuit board PCB2 to the electrical connecting port 84.

Figure 12:
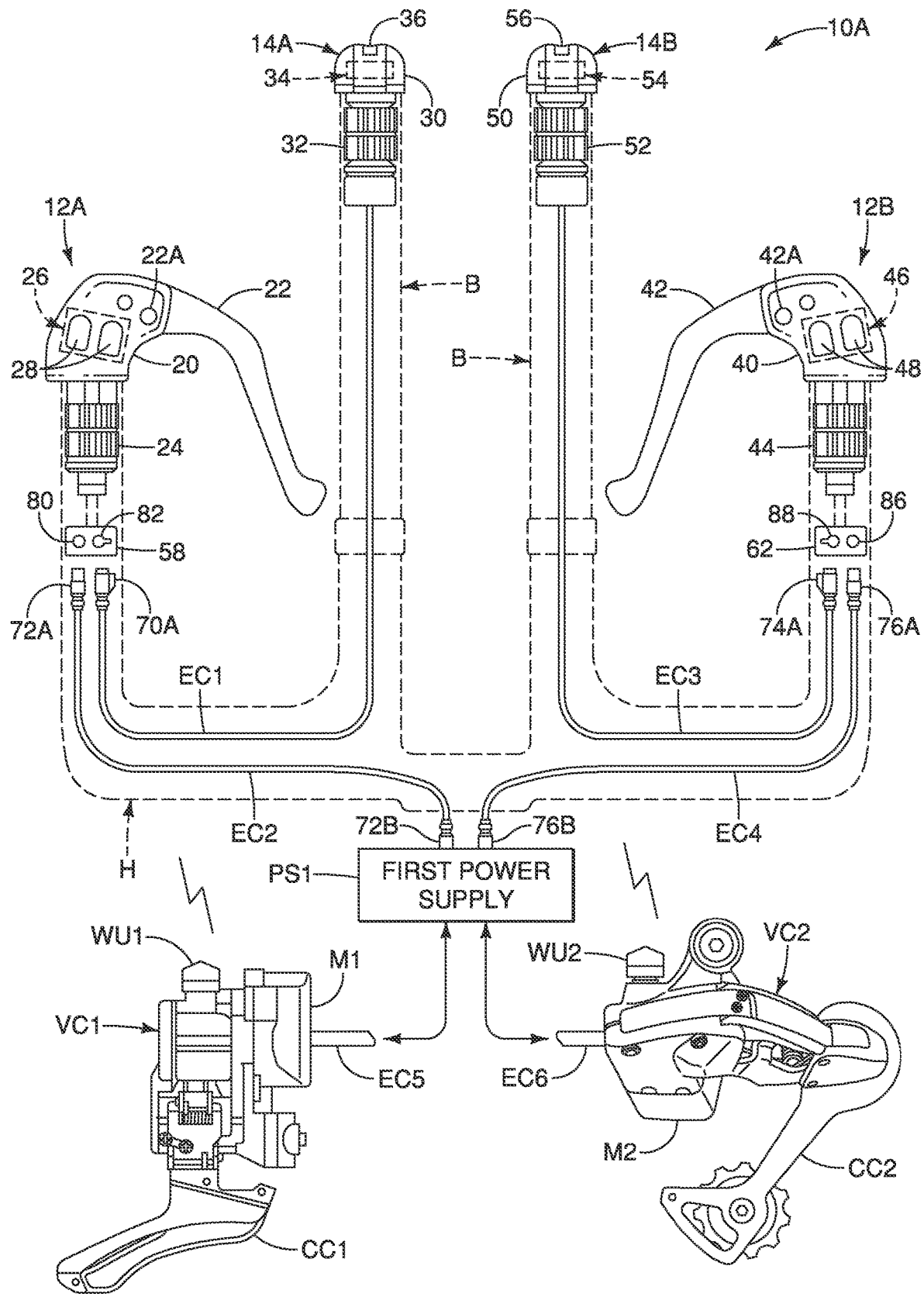
FIG. 12 is a simplified diagrammatic view of a modified control system in which the electrical connections of the first electrical cable EC1 to the second operating device 14A and the third electrical cable EC3 to the fourth operating device 14B.

Referring now to FIG. 12, a modified control system 10A is illustrated in which the first electrical cable EC1 is wired to the second electrical switch unit 34 of the second operating device 14A instead of using a pluggable type connector, and the third electrical cable EC3 is wired to the fourth electrical switch unit 54 of the fourth operating device 14B instead of using a pluggable type connector. Other than the electrical connections of the first electrical cable EC1 to the second operating device 14A and the third electrical cable EC3 to the fourth operating device 14B, the control system 10A is identical to the control system 10, which is discussed above. Thus, the control system 10A will not be discussed in further detail herein.

Figure 13:
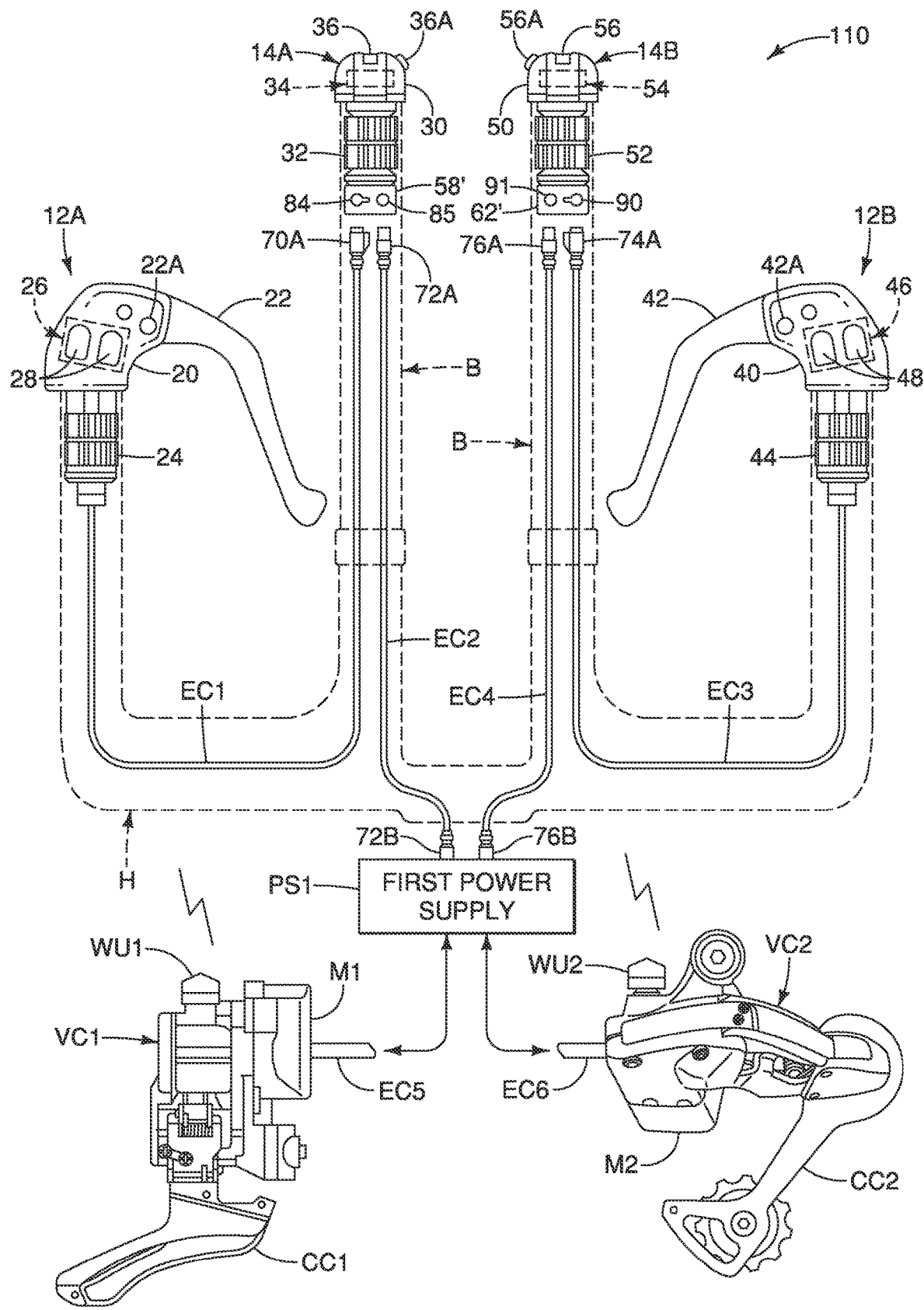
FIG. 13 is a simplified diagrammatic view of the control system in accordance with a second embodiment.

Referring now to FIG. 13, a control system 110 is illustrated in accordance with a second embodiment. In view of the similarity between the first embodiment and the second embodiment, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the control system 110, the second operating device 14A is provided with an additional second user input 36A, a wireless communication unit 58' and a wired communication port 85. In this way, the second operating device 14A becomes the main or primary operating device, while the first operating device 12A becomes the satellite or secondary operating device. Also, the wired communication port 80 and the electrical connecting port 82 have been omitted from the first operating device 12A in that the first electrical cable EC1 is wired to the first operating device 12A instead of using a pluggable type connector. Thus, the second operating device 14A is directly connected to the first power supply PS1 by the second electrical cable EC2. Namely, the first electrical connector 72A of the second electrical cable EC2 is plugged into the wired communication port 85 and the second electrical connector 72B of the second electrical cable EC2 is plugged into the first power supply PS1. Also, the second operating device 14A is directly connected to the first operating device 12A by the first electrical cable EC1. Namely, the first electrical connector 70A of the first electrical cable EC1 is plugged into the electrical connecting port 84 of the second operating device 14A, while the first electrical cable EC1 is wired to the first operating device 12A instead of using a pluggable type connector.

With this arrangement of the control system 110, the second operating device 14A includes the wireless communication unit 58' and a control unit. Alternatively, the wireless communication unit 58 and the control unit 60 can be provided on the first operating device 12A as in the first embodiment.

In the control system 110, the fourth operating device 14B is provided with an additional fourth user input 56A, a wireless communication unit 62' and a wired communication port 91. In this way, the fourth operating device 14B becomes the main or primary operating device, while the third operating device 12B becomes the satellite or secondary operating device. Also, the wired communication port 86 and the electrical connecting port 88 have been omitted from the third operating device 12B in that the third electrical cable EC3 is wired to the third operating device 12B instead of using a pluggable type connector. Thus, the fourth operating device 14B is directly connected to the first power supply PS1 by the fourth electrical cable EC4. Namely, the first electrical connector 76A of the fourth electrical cable EC4 is plugged into the wired communication port 91 and the second electrical connector 76B of the fourth electrical cable EC4 is plugged into the first power supply PS1. Also, the fourth operating device 14B is directly connected to the third operating device 12B by the third electrical cable EC3. Namely, the first electrical connector 74A of the third electrical cable EC3 is plugged into the electrical connecting port 90 of the fourth operating device 14B, while the third electrical cable EC3 is wired to the third operating device 12B instead of using a pluggable type connector.

With this arrangement of the control system 110, the fourth operating device 14B preferably includes the wireless communication unit 58' and a control unit. Alternatively, the wireless communication unit 58 and the control unit 60 can be provided on the third operating device 12B as in the first embodiment.

Figure 14:
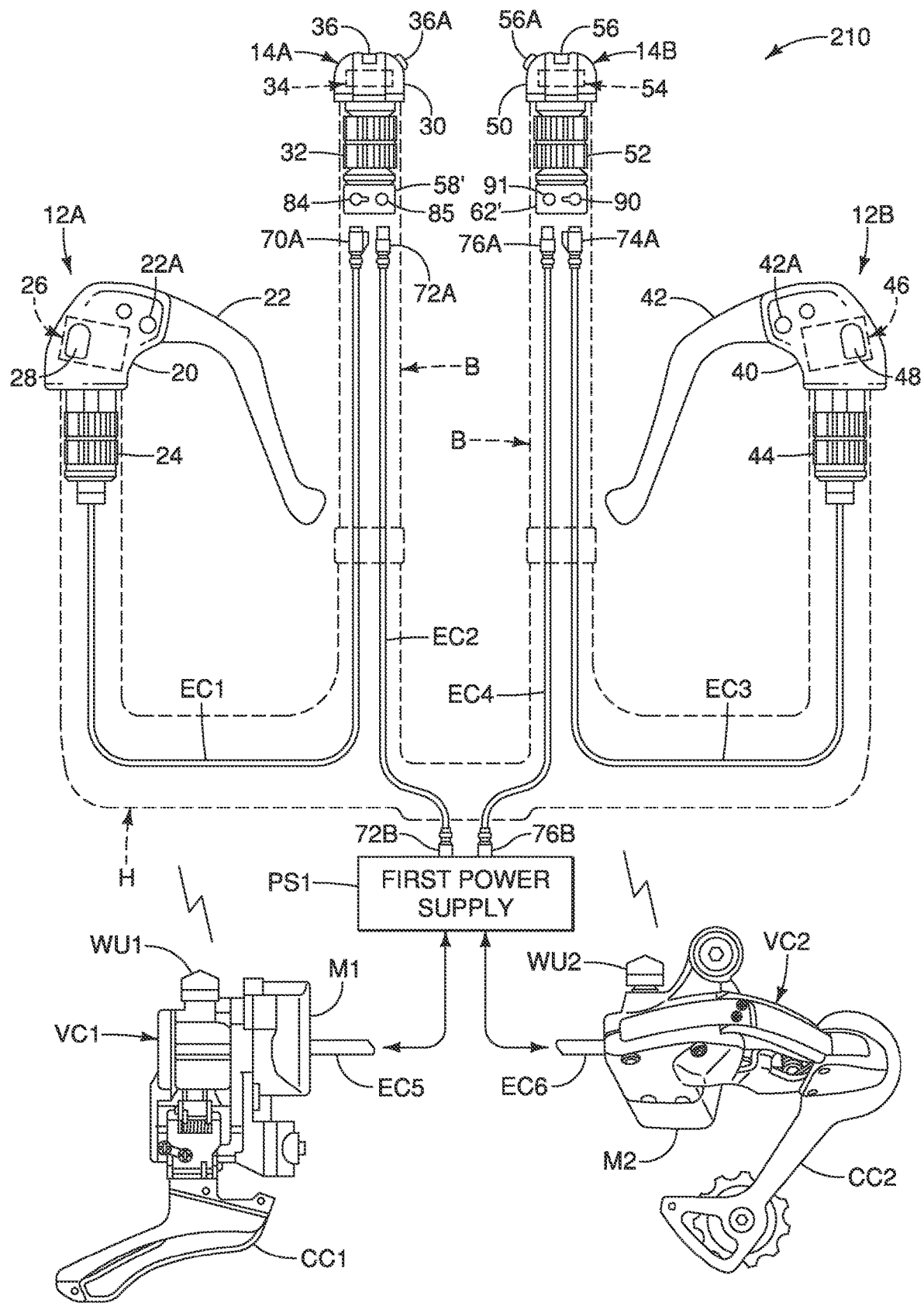
FIG. 14 is a simplified diagrammatic view of the control system in accordance with a third embodiment.

Referring now to FIG. 14, a control system 210 is illustrated in accordance with a third embodiment. The control system 210 is identical to the control system 110, except that the first operating device 12A and the third operating device 12B of the control system 210 has only one user input instead of two user inputs. In view of the similarity between the first embodiment and the prior embodiments, the parts of the third embodiment that are identical to the parts of the prior embodiments will be given the same reference numerals as the parts of the prior embodiments. Moreover, the descriptions of the parts of the third embodiment that are identical to the parts of the prior embodiments may be omitted for the sake of brevity.

Figure 15:
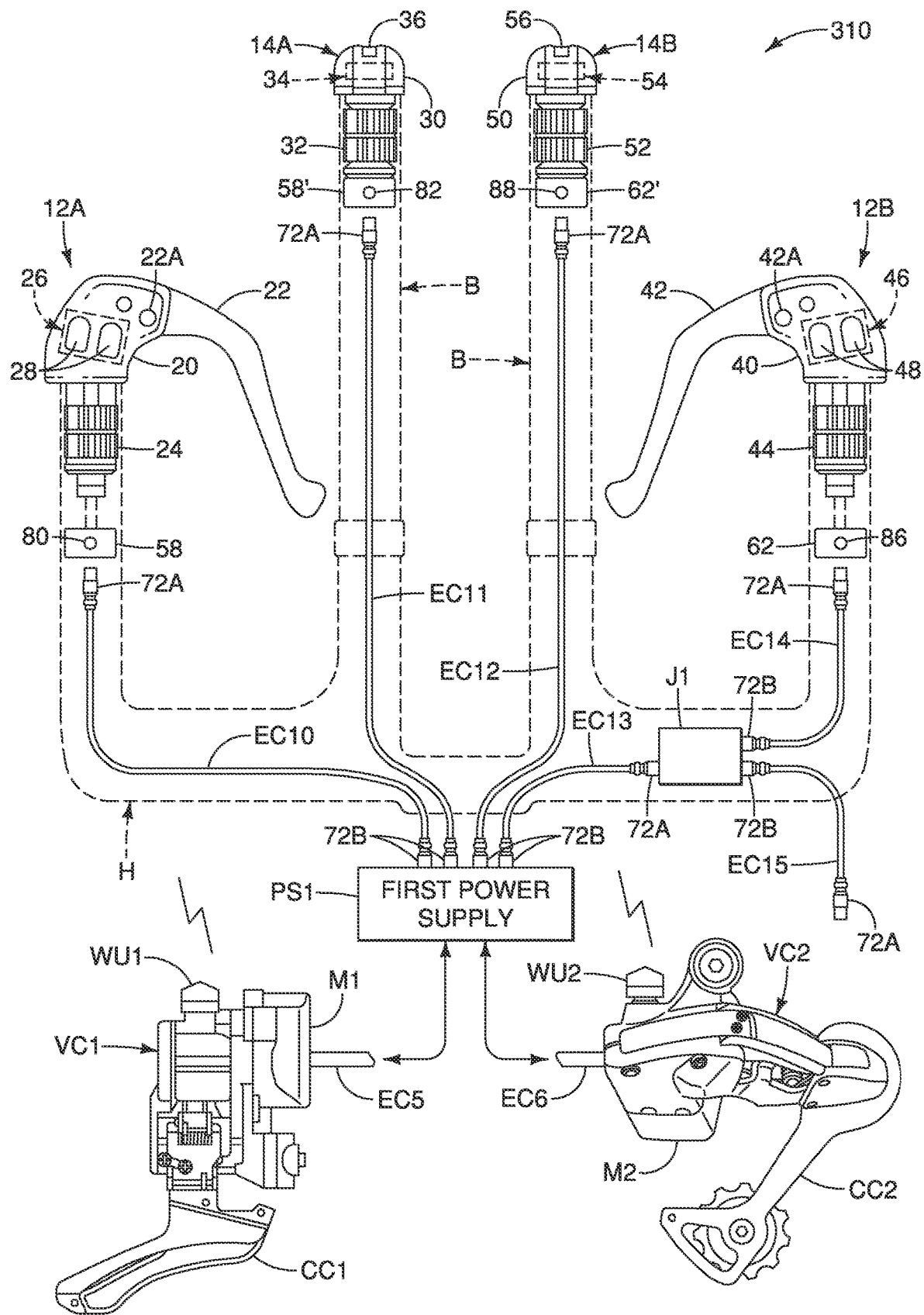
FIG. 15 is a simplified diagrammatic view of the control system in accordance with a fourth embodiment.

Referring now to FIG. 15, a control system 310 is illustrated in accordance with a fourth embodiment. Here, the first operating device 12A, the second operating device 14A, the third operating device 12B and the fourth operating device 14A are all connected to the first power supply PS1 without being electrically connected to any of the other operating devices. Also, in the control system 310, each of the first operating device 12A, the second operating device 14A, the third operating device 12B and the fourth operating device 14A are configured to wirelessly communicate with the first operated device VC1 and/or the second operated device VC2 independently from any of the other operating devices. In view of the similarity between the fourth embodiment and the prior embodiments, the parts of the fourth embodiment that are identical to the parts of the prior embodiments will be given the same reference numerals as the parts of the prior embodiments. Moreover, the descriptions of the parts of the fourth embodiment that are identical to the parts of the prior embodiments may be omitted for the sake of brevity.

In the control system 310, the second operating device 14A is provided with a wireless communication unit 58', and the fourth operating device 14B provided with a wireless communication unit 52'. Similar to the first embodiment, in the control system 310, the first operating device 12A is provided with a wireless communication unit 58, and the third operating device 12B provided with a wireless communication unit 52. Thus, each of the first operating device 12A, the second operating device 14A, the third operating device 12B and the fourth operating device 14A has its own wireless communication unit. Also, each of the first operating device 12A, the second operating device 14A, the third operating device 12B and the fourth operating device 14A has its own control unit which can be built into the wireless communication unit or can be a separate part.

In the control system 310, an electrical cable EC10 electrically connects the first operating device 12A to the first power supply PS1, an electrical cable EC11 electrically connects the second operating device 14A to the first power supply PS1, and an electrical cable EC12 electrically connects the fourth operating device 14B to the first power supply PS1. On the other hand, the third operating device 12B is connected to the first power supply PS1 via an electrical cable EC12, an electrical junction J1 and an electrical cable EC14. Since the electrical junction J1 has three ports (two input ports and one output port), an additional electrical cable EC15 can be connected to the electrical junction J1 for electrically connecting another vehicle component to the first power supply PS1 as needed and/or desired. Here, the electrical cables EC10, EC11, EC12, EC13, EC14 and EC15 are power line communication cables that each includes a pair pluggable electrical connectors 72A and 72B. Also, while only one electrical junction is used in the control system 310, additional electrical junctions can be used with any of the other power line communication cables of the control system 310. For example, the electrical cables EC10, EC11, EC12 and EC13 can be plugged into an electrical junction can be used between the electrical cables EC10, EC11, EC12 and EC13 and the first power supply PS1. In such a case, the electrical junction will have four input ports for receiving the electrical cables EC10, EC11, EC12 and EC13 and one output port for connecting the electrical junction to the first power supply PS1 by an additional electrical power line communication cable.

Figure 16:
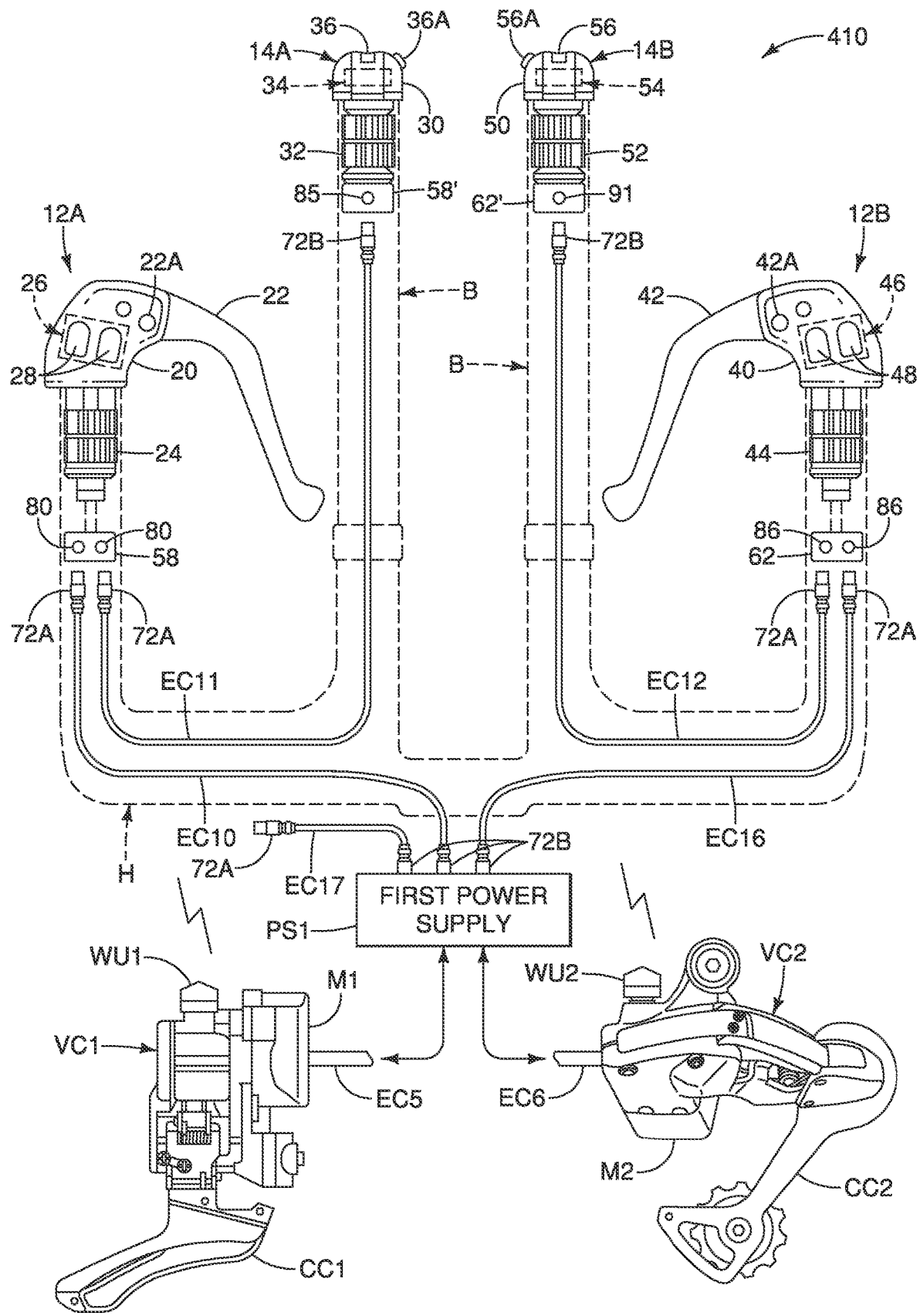
FIG. 16 is a simplified diagrammatic view of the control system in accordance with a fifth embodiment.

Referring now to FIG. 16, a control system 410 is illustrated in accordance with a fifth embodiment. Here, each of the first operating device 12A, the second operating device 14A, the third operating device 12B and the fourth operating device 14A are configured to wirelessly communicate with the first operated device VC1 and/or the second operated device VC2 independently from any of the other operating devices. However, in the control system 410, the first operating device 12A and the second operating device 14A are connected by the electrical cable EC11, while the third operating device 12B and the fourth operating device 14B are connected by the electrical cable EC12. Thus, the second operating device 14A carries out the wired communication with the first operated device VC1 and/or the second operated device VC2 via the first operating device 12A, and the fourth operating device 14B carries out the wired communication with the first operated device VC1 and/or the second operated device VC2 via the third operating device 12B.

In view of the similarity between the fifth embodiment and the prior embodiments, the parts of the fifth embodiment that are identical to the parts of the prior embodiments will be given the same reference numerals as the parts of the prior embodiments. Moreover, the descriptions of the parts of the fifth embodiment that are identical to the parts of the prior embodiments may be omitted for the sake of brevity.

In the control system 410, the electrical cable EC10 electrically connects the first operating device 12A to the first power supply PS1, the electrical cable EC11 electrically connects the second operating device 14A to the first operating device 12A, the electrical cable EC12 electrically connects the third operating device 12B to the fourth operating device 14B, and an electrical cable EC16 electrically connects the third operating device 12B to the first power supply PS1.

Here, an electrical cable EC17 is electrically connected the first power supply PS1 for connecting another operated device or another operating device to the control system 410. The electrical cable EC17 is also a power line communication cable that includes a pair pluggable electrical connectors 72A and 72B. Also, for example, the electrical cables EC10, EC16 and EC17 can be plugged into an electrical junction can be used between the electrical cables EC10, EC16 and EC17 and the first power supply PS1. In such a case, the electrical junction will have three input ports for receiving the electrical cables EC10, EC16 and EC17 and one output port for connecting the electrical junction to the first power supply PS1 by an additional electrical power line communication cable.

Also, in the control system 110, the second operating device 14A is provided with the additional second user input 36A, and the fourth operating device 14B is provided with the additional fourth user input 56A similar to the embodiments of FIGS. 13 and 14. Here, also, the second operating device 14A is provided with the wireless communication unit 58' and the fourth operating device 14B is provided with the wireless communication unit 62'.

Figure 17:
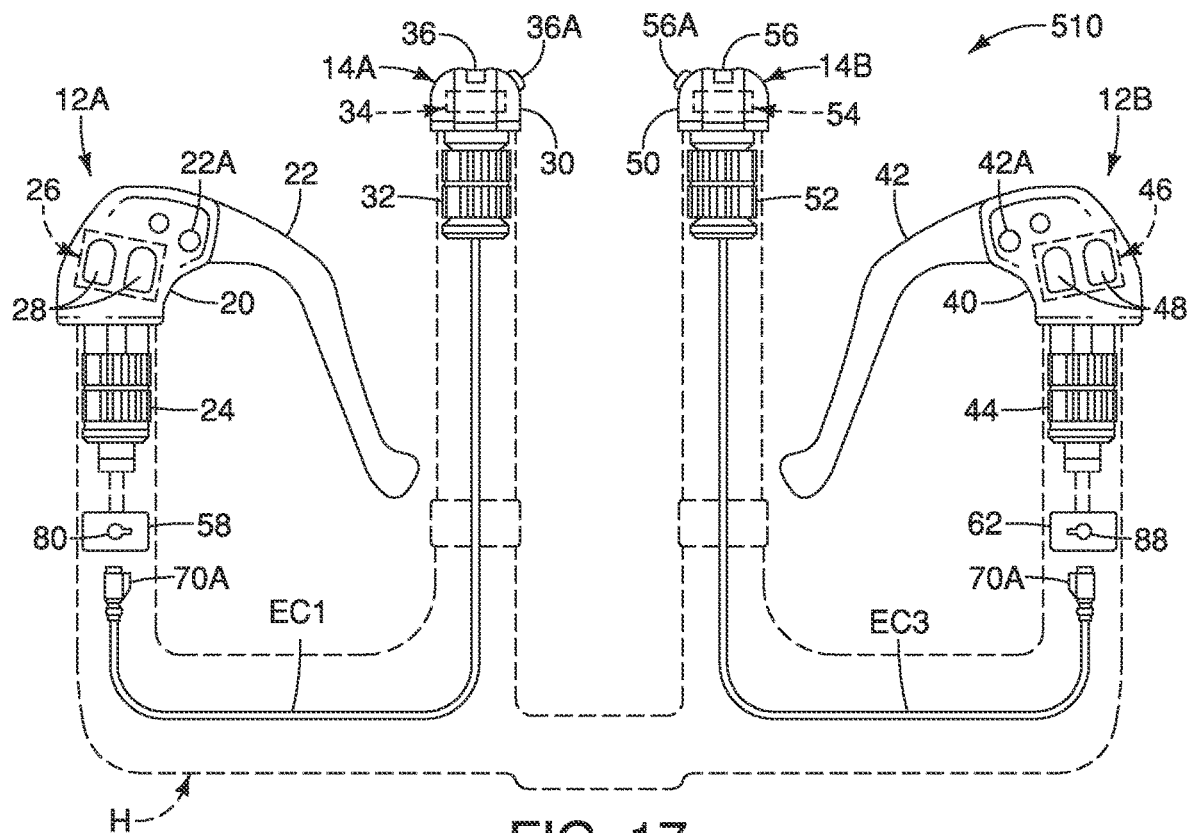
FIG. 17 is a simplified diagrammatic view of the control system in accordance with a sixth embodiment.

Referring now to FIG. 17, a control system 510 is illustrated in accordance with a sixth embodiment. Here, the first operating device 12A, the second operating device 14A, the third operating device 12B and the fourth operating device 14A are configured to only carry out wirelessly communicate with the first operated device VC1 and/or the second operated device VC2. In the control system 510, the first operating device 12A and the second operating device 14A are connected by the electrical cable EC1, while the third operating device 12B and the fourth operating device 14B are connected by the electrical cable EC3. Also, here, the first operating device 12A includes the wireless communication unit 58 and the third operating device 12B includes the wireless communication unit 62. On the other hand, the second operating device 14A and the fourth operating device 14B do not have a wireless communication unit. Rather, the second operating device 14A uses the wireless communication unit 58 of the first operating device 12A, and the fourth operating device 14B uses the wireless communication unit 62 of the third operating device 12B. In addition, in the control system 510, the second operating device 14A is provided with an additional second user input 36A, and the fourth operating device 14B is provided with an additional fourth user input 56A similar to the control system 110.

In view of the similarity between the sixth embodiment and the prior embodiments, the parts of the sixth embodiment that are identical to the parts of the prior embodiments will be given the same reference numerals as the parts of the prior embodiments. Moreover, the descriptions of the parts of the sixth embodiment that are identical to the parts of the prior embodiments may be omitted for the sake of brevity.

Figure 18:
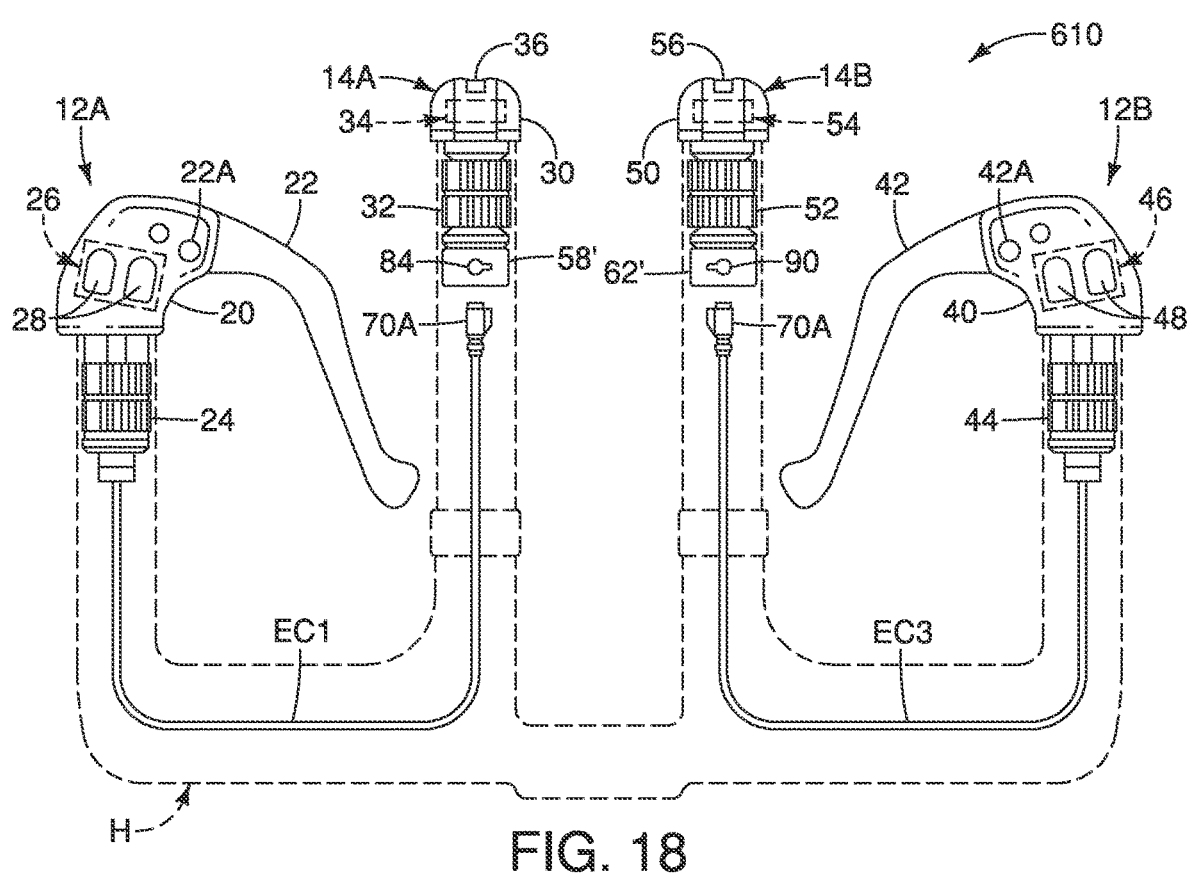
FIG. 18 is a simplified diagrammatic view of the control system in accordance with a seventh embodiment.

Referring now to FIG. 18, a control system 610 is illustrated in accordance with a seventh embodiment. Here, the first operating device 12A, the second operating device 14A, the third operating device 12B and the fourth operating device 14A are configured to only carry out wirelessly communicate with the first operated device VC1 and/or the second operated device VC2. In the control system 610, the first operating device 12A and the second operating device 14A are connected by the electrical cable EC1, while the third operating device 12B and the fourth operating device 14B are connected by the electrical cable EC3. Also, here, the second operating device 14A includes the wireless communication unit 58' and the fourth operating device 14B includes the wireless communication unit 62'. On the other hand, the first operating device 12A and the third operating device 12B do not have a wireless communication unit. Rather, the first operating device 12A uses the wireless communication unit 58' of the second operating device 14A, and the third operating device 12B uses the wireless communication unit 62' of the fourth operating device 14B.

In view of the similarity between the seventh embodiment and the prior embodiments, the parts of the seventh embodiment that are identical to the parts of the prior embodiments will be given the same reference numerals as the parts of the prior embodiments. Moreover, the descriptions of the parts of the seventh embodiment that are identical to the parts of the prior embodiments may be omitted for the sake of brevity.

Figure 19:
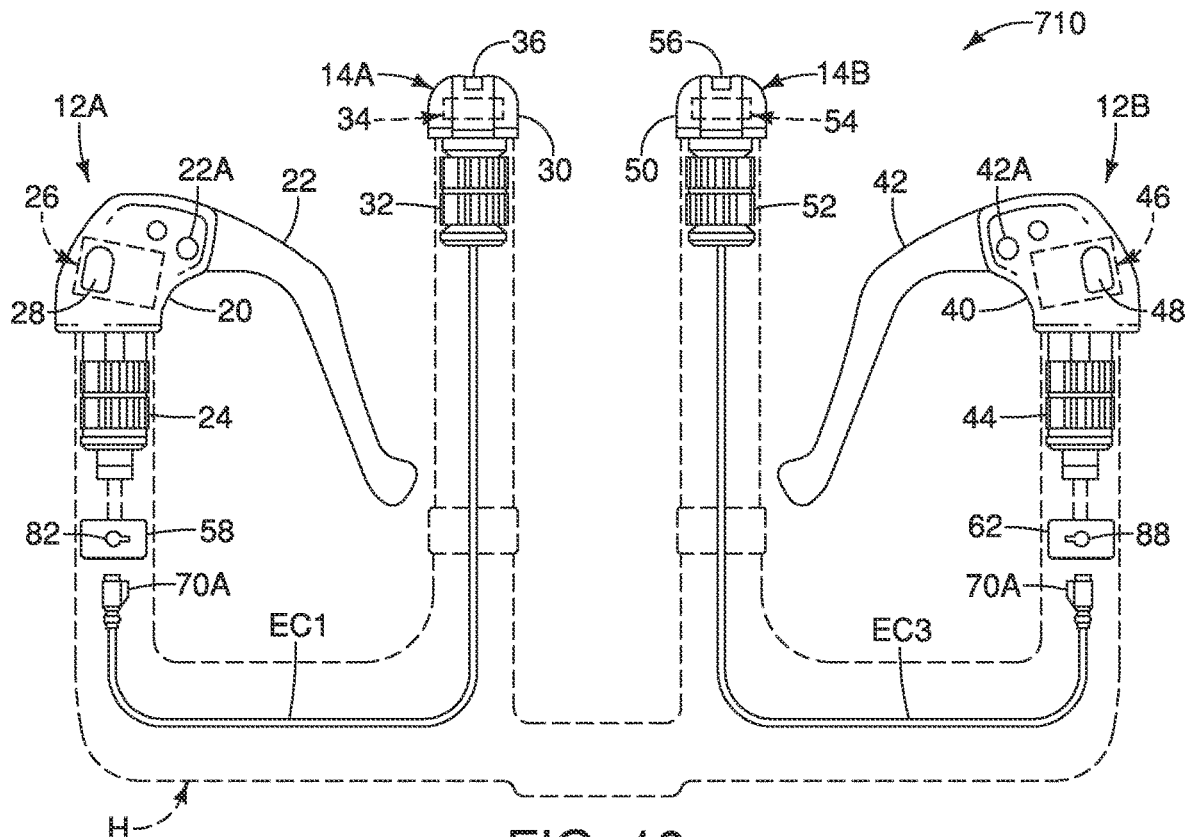
FIG. 19 is a simplified diagrammatic view of the control system in accordance with an eighth embodiment.

Referring now to FIG. 19, a control system 710 is illustrated in accordance with an eighth embodiment. The control system 710 is identical to the control system 710 510, except that the first operating device 12A has only one first user input 28, the second operating device 14A has only one second user input 36, the third operating device 12B has only one third user input 48, and the fourth operating device 14B has only one second user input 56. Thus, the first operating device 12A, the second operating device 14A, the third operating device 12B and the fourth operating device 14A are configured to only carry out wirelessly communicate with the first operated device VC1 and/or the second operated device VC2. In the control system 910, the first operating device 12A and the second operating device 14A are connected by the electrical cable EC1, while the third operating device 12B and the fourth operating device 14B are connected by the electrical cable EC3. Also, here, the first operating device 12A includes the wireless communication unit 58 and the third operating device 12B includes the wireless communication unit 62. On the other hand, the second operating device 14A and the fourth operating device 14B do not have a wireless communication unit. Rather, the second operating device 14A uses the wireless communication unit 58 of the first operating device 12A, and the fourth operating device 14B uses the wireless communication unit 62 of the third operating device 12B.

In view of the similarity between the eighth embodiment and the prior embodiments, the parts of the eighth embodiment that are identical to the parts of the prior embodiments will be given the same reference numerals as the parts of the prior embodiments. Moreover, the descriptions of the parts of the eighth embodiment that are identical to the parts of the prior embodiments may be omitted for the sake of brevity.

Figure 20:
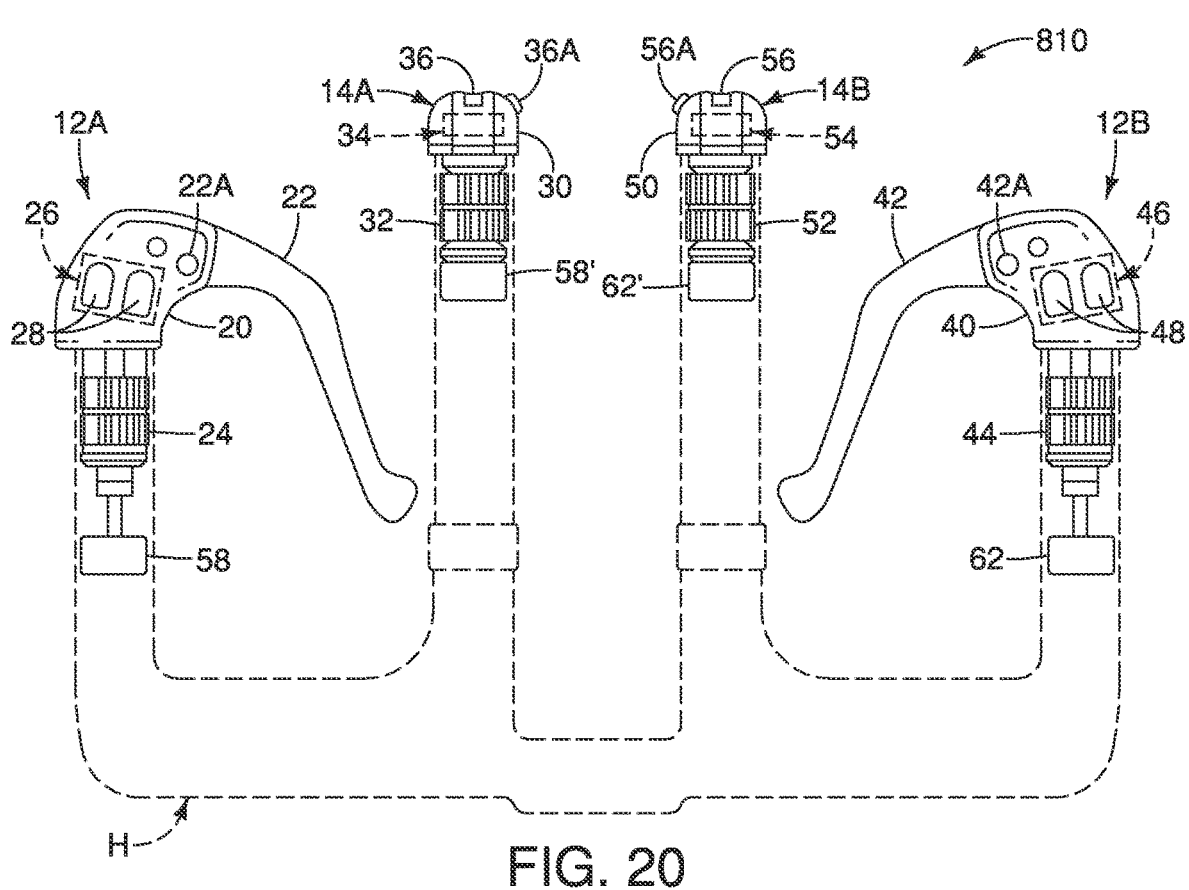
FIG. 20 is a simplified diagrammatic view of the control system in accordance with a ninth embodiment.

Referring now to FIG. 20, a control system 810 is illustrated in accordance with a ninth embodiment. Here, the first operating device 12A, the second operating device 14A, the third operating device 12B and the fourth operating device 14A are configured to only carry out wirelessly communicate with the first operated device VC1 and/or the second operated device VC2. In the control system 810, none of the first operating device 12A, the second operating device 14A, the third operating device 12B and the fourth operating device 14A are connected to the first power supply PS1. Also, none of the first operating device 12A, the second operating device 14A, the third operating device 12B and the fourth operating device 14A are interconnected. In other words, each of the first operating device 12A, the second operating device 14A, the third operating device 12B and the fourth operating device 14A has its own communication unit for independent wireless communication with the first operated device VC1 and/or the second operated device VC2. In view of the similarity between the ninth embodiment and the prior embodiments, the parts of the ninth embodiment that are identical to the parts of the prior embodiments will be given the same reference numerals as the parts of the prior embodiments. Moreover, the descriptions of the parts of the ninth embodiment that are identical to the parts of the prior embodiments may be omitted for the sake of brevity.

Figure 21:
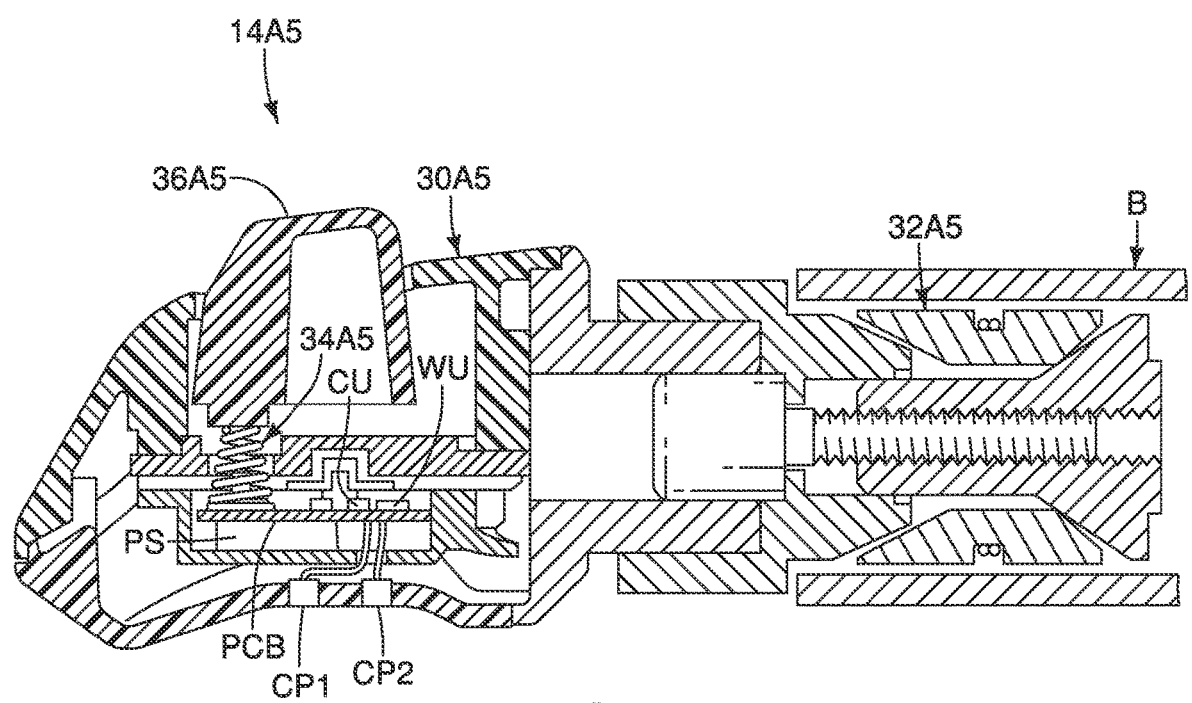
FIG. 21 is a cross sectional view of an alternate operating device that can be used with any of the control systems wherein only wireless communication is to be used.

Referring now to FIG. 21, an alternate operating device 14A5 is illustrated that can be used with any of the control systems wherein only wireless communication is to be used. The alternate operating device 14A5 is particularly useful in the control system 810. The alternate operating device 14A5 is a self-contained component that includes a base 30A5, a handlebar attachment 32A5 and an electrical switch unit 34A5. Here, the alternate operating device 14A5 includes a circuit board PCB that is provided with the electrical switch unit 34A5. The circuit board PCB is electrically connected to a power supply PS. The second operating device 14A5 includes at least one of a second user input 36A5 for operating the electrical switch unit 34A5. The alternate operating device 14A5 includes a control unit CU and a wireless communication unit WU. In this way, the control unit CU controls the wireless communication unit WU to transmit wireless control signals to an operated device of the human-powered vehicle V. Since the parts and the operation of the second operating device 14A5 correspond to the parts discussed above having the same function, the second operating device 14A5 will not be discussed in further detail herein.

Preferably, the alternate operating device 14A5 includes a connector port CP1 configured to receive a power line/firmware updates and a connector port CP2 configured to be coupled to an additional/satellite device. It will be apparent from this disclosure that one or both of the connector port CP1 and the connector port CP2 can be omitted if desired.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a human-powered vehicle field (e.g., bicycle) in an upright, riding position and equipped with the control system. Accordingly, these directional terms, as utilized to describe the control system should be interpreted relative to a human-powered vehicle field (e.g., bicycle) in an upright riding position on a horizontal surface and that is equipped with the control system. The terms "left" and "right" are used to indicate the "right" when referencing from the right side as viewed from the rear of the human-powered vehicle field (e.g., bicycle), and the "left" when referencing from the left side as viewed from the rear of the human-powered vehicle field (e.g., bicycle).

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three.

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A control system for a human-powered vehicle, the control system comprising:
   a first operating device including
      a first base, a first operating member,
      a first handlebar attachment provided to the first base, and
      a first electrical switch unit coupled to at least one of the first base and the first operating member;
   a second operating device including
      a second base,
      a second handlebar attachment provided to the second base, and
      a second electrical switch unit coupled to the second base, the second operating device electrically connected to the first operating device;
   a wireless communication unit electrically connected to the first operating device and the second operating device, the wireless communication unit abutting the first operating device and being spaced from the second operating device; and
   a control unit configured to selectively control the wireless communication unit to establish wireless communication with an operated device in accordance with a control state of the control unit.

2. The control system according to claim 1, wherein the wireless communication unit is disposed on the control unit.

3. The control system according to claim 1, further comprising
   a wired communication port electrically connected to the control unit for selectively connecting the first operating device and the second operating device to the operated device via an electrical cable.

4. The control system according to claim 3, wherein
the control state includes a first control state where the wired communication port is electrically connected to the electrical cable, and a second control state where the wired communication port is free from electrically connecting to the electrical cable, and
the control unit is configured to establish wired communication, where the first operating device and the second operating device are electrically connected to the operated device via the electrical cable in the first control state.

5. The control system according to claim 4, wherein
the control unit is configured to establish the wireless communication in the second control state.

6. The control system according to claim 4, wherein
the control unit is further configured to control electric power supplied from a first power supply to the first operating device and the second operating device in the first control state.

7. The control system according to claim 6, wherein
the first power supply is connected to at least one of the first operating device, the second operating device and the control unit.

8. The control system according to claim 4, wherein
the control unit is further configured to control electric power supplied from a second power supply such that the first operating device and the second operating device are wirelessly in communication with the operated device via the wireless communication unit in the second control state.

9. The control system according to claim 8, wherein
the second power supply is disposed to at least one of the first operating device, the second operating device, the control unit and the wireless communication unit.

10. The control system according to claim 1, wherein
at least one of the first operating device and the second operating device includes an electrical connecting port.

11. The control system according to claim 10, wherein
the other one of the first operating device and the second operating device includes an electrical connector that is coupled into the electrical connecting port.

12. The control system according to claim 1, further comprising
a detector configured to detect information of the control state.

13. The control system according to claim 1, further comprising
a notification unit configured to notify the control state.

14. The control system according to claim 1, wherein
the first operating device includes at least one first user input disposed to at least one the first operating member and the first base, the first user input is connected to the first electrical switch unit, and
the second operating device including at least one of a second user input and a second operating member, the at least one of the second user input and the second operating member is connected to the second electrical switch unit.

15. The control system according to claim 1, wherein
the first operating member is pivotally mounted to the first base.

16. The control system according to claim 1, wherein
the control unit is configured to selectively transmit a signal in accordance with actuation of at least one of the first electrical switch unit and the second electrical switch unit.

17. The control system according to claim 1, wherein
the operated device is a transmission device.

18. The control system according to claim 1, wherein
the first and second operating devices are electrically connected by an electrical cable.

19. The control system according to claim 1, wherein
the first operating device includes a first substrate, the first substrate being disposed inside the first base,
the second operating device includes a second substrate, the second substrate being disposed inside the second base, and
the wireless communication unit being provided on the first substrate.

* * * * *